(12) United States Patent
Neudecker et al.

(10) Patent No.: US 8,431,264 B2
(45) Date of Patent: *Apr. 30, 2013

(54) HYBRID THIN-FILM BATTERY

(75) Inventors: Bernd J. Neudecker, Littleton, CO (US); Shawn W. Snyder, Golden, CO (US)

(73) Assignee: Infinite Power Solutions, Inc., Littleton, CO (US)

( * ) Notice: Subject to any disclaimer, the term of this patent is extended or adjusted under 35 U.S.C. 154(b) by 774 days.

This patent is subject to a terminal disclaimer.

(21) Appl. No.: 12/179,701

(22) Filed: Jul. 25, 2008

(65) Prior Publication Data

US 2008/0286651 A1    Nov. 20, 2008

Related U.S. Application Data

(63) Continuation-in-part of application No. 11/561,277, filed on Nov. 17, 2006, and a continuation-in-part of application No. 11/209,536, filed on Aug. 23, 2005, which is a continuation of application No. 11/374,282, filed on Jun. 15, 2005, which is a continuation-in-part of application No. 10/215,190, filed on Aug. 9, 2002, now Pat. No. 6,916, 679.

(60) Provisional application No. 60/737,613, filed on Nov. 17, 2005, provisional application No. 60/759,479, filed on Jan. 17, 2006, provisional application No. 60/782,792, filed on Mar. 16, 2006.

(51) Int. Cl.
*H01M 2/16*    (2006.01)

(52) U.S. Cl.
USPC .......................... 429/137; 429/142; 429/144

(58) Field of Classification Search .................. None
See application file for complete search history.

(56) References Cited

U.S. PATENT DOCUMENTS

| | | | |
|---|---|---|---|
| 712,316 | A | 10/1902 | Loppe et al. |
| 1,712,316 | A | 10/1902 | Loppe et al. |

(Continued)

FOREIGN PATENT DOCUMENTS

| | | |
|---|---|---|
| CN | 1415124 | 4/2003 |
| CN | 1532984 | 9/2004 |

(Continued)

OTHER PUBLICATIONS

Celgard Product Data Sheet retrieved from <http://www.celgard.com/pdf/library/Celgard_Product_Comparison_10002.pdf > on Jun. 27, 2011.*

(Continued)

*Primary Examiner* — Cynthia Walls
(74) *Attorney, Agent, or Firm* — Jeff E. Schwartz; Fox Rothschild LLP

(57) ABSTRACT

An electrochemical device is claimed and disclosed wherein certain embodiments have a cathode greater than about 4 μm and less than about 200 μm thick; a thin electrolyte less than about 10 μm thick; and an anode less than about 30 μm thick. Another claimed and disclosed electrochemical device includes a cathode greater than about 0.5 μm and less than about 200 μm thick; a thin electrolyte less than about 10 μm thick; and an anode less than about 30 μm thick, wherein the cathode is fabricated by a non-vapor phase deposition method. A non-vacuum deposited cathode may be rechargeable or non-rechargeable. The cathode may be made of $CF_x$ (carbon fluoride) material, wherein, for example, $0<x<4$. The electrochemical device may also include a substrate, a current collector, an anode current collector, encapsulation and a moderating layer.

16 Claims, 14 Drawing Sheets

U.S. PATENT DOCUMENTS

| | | |
|---|---|---|
| 2,970,180 A | 1/1961 | Urry |
| 3,309,302 A | 3/1967 | Heil |
| 3,616,403 A | 10/1971 | Collins et al. |
| 3,790,432 A | 2/1974 | Fletcher et al. |
| 3,797,091 A | 3/1974 | Gavin |
| 3,850,604 A | 11/1974 | Klein |
| 3,939,008 A | 2/1976 | Longo et al. |
| 4,082,569 A | 4/1978 | Evans, Jr. |
| 4,111,523 A | 9/1978 | Kaminow et al. |
| 4,127,424 A | 11/1978 | Ullery, Jr. |
| 4,226,924 A | 10/1980 | Kimura et al. |
| 4,283,216 A | 8/1981 | Brereton |
| 4,318,938 A | 3/1982 | Barnett et al. |
| 4,328,297 A | 5/1982 | Bilhorn |
| 4,395,713 A | 7/1983 | Nelson et al. |
| 4,437,966 A | 3/1984 | Hope et al. |
| 4,442,144 A | 4/1984 | Pipkin |
| 4,467,236 A | 8/1984 | Kolm et al. |
| 4,481,265 A | 11/1984 | Ezawa et al. |
| 4,518,661 A | 5/1985 | Rippere |
| 4,555,456 A | 11/1985 | Kanehori et al. |
| 4,572,873 A | 2/1986 | Kanehori et al. |
| 4,587,225 A | 5/1986 | Tsukuma et al. |
| 4,619,680 A | 10/1986 | Nourshargh et al. |
| 4,645,726 A | 2/1987 | Hiratani et al. |
| 4,664,993 A | 5/1987 | Sturgis et al. |
| 4,668,593 A | 5/1987 | Sammells |
| RE32,449 E | 6/1987 | Claussen |
| 4,672,586 A | 6/1987 | Shimohigashi et al. |
| 4,710,940 A | 12/1987 | Sipes, Jr. |
| 4,728,588 A | 3/1988 | Noding et al. |
| 4,740,431 A | 4/1988 | Little |
| 4,756,717 A | 7/1988 | Sturgis et al. |
| 4,785,459 A | 11/1988 | Baer |
| 4,826,743 A | 5/1989 | Nazri |
| 4,865,428 A | 9/1989 | Corrigan |
| 4,878,094 A | 10/1989 | Balkanski |
| 4,903,326 A | 2/1990 | Zakman et al. |
| 4,915,810 A | 4/1990 | Kestigian et al. |
| 4,964,877 A | 10/1990 | Keister et al. |
| 4,977,007 A | 12/1990 | Kondo et al. |
| 4,978,437 A | 12/1990 | Wirz |
| 5,006,737 A | 4/1991 | Fay |
| 5,019,467 A | 5/1991 | Fujiwara |
| 5,030,331 A | 7/1991 | Sato |
| 5,035,965 A | 7/1991 | Sangyoji et al. |
| 5,055,704 A | 10/1991 | Link et al. |
| 5,057,385 A | 10/1991 | Hope et al. |
| 5,085,904 A | 2/1992 | Deak et al. |
| 5,096,852 A | 3/1992 | Hobson |
| 5,100,821 A | 3/1992 | Fay |
| 5,107,538 A | 4/1992 | Benton et al. |
| 5,110,694 A | 5/1992 | Nagasubramanian et al. |
| 5,110,696 A | 5/1992 | Shokoohi et al. |
| 5,119,269 A | 6/1992 | Nakayama |
| 5,119,460 A | 6/1992 | Bruce et al. |
| 5,124,782 A | 6/1992 | Hundt et al. |
| 5,147,985 A | 9/1992 | DuBrucq |
| 5,153,710 A | 10/1992 | McCain |
| 5,169,408 A | 12/1992 | Biggerstaff et al. |
| 5,171,413 A | 12/1992 | Arntz et al. |
| 5,173,271 A | 12/1992 | Chen et al. |
| 5,174,876 A | 12/1992 | Buchal et al. |
| 5,180,645 A | 1/1993 | Moré |
| 5,187,564 A | 2/1993 | McCain |
| 5,196,041 A | 3/1993 | Tumminelli et al. |
| 5,196,374 A | 3/1993 | Hundt et al. |
| 5,200,029 A | 4/1993 | Bruce et al. |
| 5,202,201 A | 4/1993 | Meunier et al. |
| 5,206,925 A | 4/1993 | Nakazawa et al. |
| 5,208,121 A | 5/1993 | Yahnke et al. |
| 5,217,828 A | 6/1993 | Sangyoji et al. |
| 5,221,891 A | 6/1993 | Janda et al. |
| 5,225,288 A | 7/1993 | Beeson et al. |
| 5,227,264 A | 7/1993 | Duval et al. |
| 5,237,439 A | 8/1993 | Misono et al. |
| 5,252,194 A | 10/1993 | Demaray et al. |
| 5,262,254 A | 11/1993 | Koksbang et al. |
| 5,273,608 A | 12/1993 | Nath |
| 5,287,427 A | 2/1994 | Atkins et al. |
| 5,296,089 A | 3/1994 | Chen et al. |
| 5,300,461 A | 4/1994 | Ting |
| 5,302,474 A | 4/1994 | Shackle et al. |
| 5,303,319 A | 4/1994 | Ford et al. |
| 5,306,569 A | 4/1994 | Hiraki |
| 5,307,240 A | 4/1994 | McMahon |
| 5,309,302 A | 5/1994 | Vollmann |
| 5,314,765 A | 5/1994 | Bates |
| 5,326,652 A | 7/1994 | Lake |
| 5,326,653 A | 7/1994 | Chang |
| 5,338,624 A | 8/1994 | Gruenstern et al. |
| 5,338,625 A | 8/1994 | Bates et al. |
| 5,342,709 A | 8/1994 | Yahnke et al. |
| 5,355,089 A | 10/1994 | Treger et al. |
| 5,360,686 A | 11/1994 | Peled et al. |
| 5,362,579 A | 11/1994 | Rossoll et al. |
| 5,381,262 A | 1/1995 | Arima et al. |
| 5,387,482 A | 2/1995 | Anani |
| 5,401,595 A | 3/1995 | Kagawa et al. |
| 5,403,680 A | 4/1995 | Otagawa et al. |
| 5,411,537 A | 5/1995 | Munshi et al. |
| 5,411,592 A | 5/1995 | Ovshinsky et al. |
| 5,419,982 A | 5/1995 | Tura et al. |
| 5,427,669 A | 6/1995 | Drummond |
| 5,435,826 A | 7/1995 | Sakakibara et al. |
| 5,437,692 A | 8/1995 | Dasgupta et al. |
| 5,445,856 A | 8/1995 | Chaloner-Gill |
| 5,445,906 A | 8/1995 | Hobson et al. |
| 5,448,110 A | 9/1995 | Tuttle et al. |
| 5,449,576 A | 9/1995 | Anani |
| 5,455,126 A | 10/1995 | Bates et al. |
| 5,457,569 A | 10/1995 | Liou et al. |
| 5,458,995 A | 10/1995 | Behl et al. |
| 5,464,692 A | 11/1995 | Huber |
| 5,464,706 A | 11/1995 | Dasgupta et al. |
| 5,470,396 A | 11/1995 | Mongon et al. |
| 5,472,795 A | 12/1995 | Atita |
| 5,475,528 A | 12/1995 | LaBorde |
| 5,478,456 A | 12/1995 | Humpal et al. |
| 5,483,613 A | 1/1996 | Bruce et al. |
| 5,493,177 A | 2/1996 | Muller et al. |
| 5,498,489 A | 3/1996 | Dasgupta et al. |
| 5,499,207 A | 3/1996 | Miki et al. |
| 5,501,918 A | 3/1996 | Gruenstern et al. |
| 5,504,041 A | 4/1996 | Summerfelt |
| 5,512,147 A | 4/1996 | Bates et al. |
| 5,512,387 A | 4/1996 | Ovshinsky |
| 5,512,389 A | 4/1996 | Dasgupta et al. |
| 5,538,796 A | 7/1996 | Schaffer et al. |
| 5,540,742 A | 7/1996 | Sangyoji et al. |
| 5,547,780 A | 8/1996 | Kagawa et al. |
| 5,547,781 A | 8/1996 | Blonsky et al. |
| 5,547,782 A | 8/1996 | Dasgupta et al. |
| 5,552,242 A | 9/1996 | Ovshinsky et al. |
| 5,555,127 A | 9/1996 | Abdelkader et al. |
| 5,561,004 A | 10/1996 | Bates et al. |
| 5,563,979 A | 10/1996 | Bruce et al. |
| 5,565,071 A | 10/1996 | Demaray et al. |
| 5,567,210 A | 10/1996 | Bates et al. |
| 5,569,520 A | 10/1996 | Bates |
| 5,582,935 A | 12/1996 | Dasgupta et al. |
| 5,591,520 A | 1/1997 | Migliorini et al. |
| 5,597,660 A | 1/1997 | Bates et al. |
| 5,597,661 A | 1/1997 | Takeuchi et al. |
| 5,599,355 A | 2/1997 | Nagasubramanian et al. |
| 5,601,952 A | 2/1997 | Dasgupta et al. |
| 5,603,816 A | 2/1997 | Demaray et al. |
| 5,607,560 A | 3/1997 | Hirabayashi et al. |
| 5,607,789 A | 3/1997 | Treger et al. |
| 5,612,152 A | 3/1997 | Bates et al. |
| 5,612,153 A | 3/1997 | Moulton et al. |
| 5,613,995 A | 3/1997 | Bhandarkar et al. |
| 5,616,933 A | 4/1997 | Li |
| 5,618,382 A | 4/1997 | Mintz et al. |
| 5,625,202 A | 4/1997 | Chai |
| 5,637,418 A | 6/1997 | Brown et al. |
| 5,643,480 A | 7/1997 | Gustavsson et al. |

| | | | | | | |
|---|---|---|---|---|---|---|
| 5,644,207 A | 7/1997 | Lew et al. | | 5,985,485 A | 11/1999 | Ovshinsky et al. |
| 5,645,626 A | 7/1997 | Edlund et al. | | 6,000,603 A | 12/1999 | Koskenmaki et al. |
| 5,645,960 A | 7/1997 | Scrosati et al. | | 6,001,224 A | 12/1999 | Drummond et al. |
| 5,654,054 A | 8/1997 | Tropsha et al. | | 6,004,660 A | 12/1999 | Topolski et al. |
| 5,654,984 A | 8/1997 | Hershbarger et al. | | 6,007,945 A | 12/1999 | Jacobs et al. |
| 5,658,652 A | 8/1997 | Sellergren | | 6,013,949 A | 1/2000 | Tuttle |
| 5,660,700 A | 8/1997 | Shimizu et al. | | 6,019,284 A | 2/2000 | Freeman et al. |
| 5,665,490 A | 9/1997 | Takeuchi et al. | | 6,023,610 A | 2/2000 | Wood, Jr. |
| 5,667,538 A | 9/1997 | Bailey | | 6,024,844 A | 2/2000 | Drummond et al. |
| 5,677,784 A | 10/1997 | Harris | | 6,025,094 A | 2/2000 | Visco et al. |
| 5,679,980 A | 10/1997 | Summerfelt | | 6,028,990 A | 2/2000 | Shahani et al. |
| 5,681,666 A | 10/1997 | Treger et al. | | 6,030,421 A | 2/2000 | Gauthier et al. |
| 5,686,360 A | 11/1997 | Harvey, III et al. | | 6,033,768 A | 3/2000 | Muenz et al. |
| 5,689,522 A | 11/1997 | Beach | | 6,042,965 A | 3/2000 | Nestler et al. |
| 5,693,956 A | 12/1997 | Shi et al. | | 6,045,626 A | 4/2000 | Yano et al. |
| 5,702,829 A | 12/1997 | Paidassi et al. | | 6,045,652 A | 4/2000 | Tuttle et al. |
| 5,705,293 A | 1/1998 | Hobson | | 6,045,942 A | 4/2000 | Miekka et al. |
| 5,716,728 A * | 2/1998 | Smesko et al. ............... 429/60 | | 6,046,081 A | 4/2000 | Kuo |
| 5,718,813 A | 2/1998 | Drummond et al. | | 6,046,514 A | 4/2000 | Rouillard et al. |
| 5,719,976 A | 2/1998 | Henry et al. | | 6,048,372 A | 4/2000 | Mangahara et al. |
| 5,721,067 A | 2/1998 | Jacobs et al. | | 6,051,114 A | 4/2000 | Yao et al. |
| RE35,746 E | 3/1998 | Lake | | 6,051,296 A | 4/2000 | McCaulley et al. |
| 5,731,661 A | 3/1998 | So et al. | | 6,052,397 A | 4/2000 | Jeon et al. |
| 5,738,731 A | 4/1998 | Shindo et al. | | 6,057,557 A | 5/2000 | Ichikawa |
| 5,742,094 A | 4/1998 | Ting | | 6,058,233 A | 5/2000 | Dragone |
| 5,755,938 A | 5/1998 | Fukui et al. | | 6,071,323 A | 6/2000 | Kawaguchi |
| 5,755,940 A | 5/1998 | Shindo | | 6,075,973 A | 6/2000 | Greeff et al. |
| 5,757,126 A | 5/1998 | Harvey, III et al. | | 6,077,106 A | 6/2000 | Mish |
| 5,762,768 A | 6/1998 | Goy et al. | | 6,077,642 A | 6/2000 | Ogata et al. |
| 5,763,058 A | 6/1998 | Isen et al. | | 6,078,791 A | 6/2000 | Tuttle et al. |
| 5,771,562 A | 6/1998 | Harvey, III et al. | | 6,080,508 A | 6/2000 | Dasgupta et al. |
| 5,776,278 A | 7/1998 | Tuttle et al. | | 6,080,643 A | 6/2000 | Noguchi et al. |
| 5,779,839 A | 7/1998 | Tuttle et al. | | 6,093,944 A | 7/2000 | VanDover |
| 5,790,489 A | 8/1998 | O'Connor | | 6,094,292 A | 7/2000 | Goldner et al. |
| 5,792,550 A | 8/1998 | Phillips et al. | | 6,096,569 A | 8/2000 | Matsuno et al. |
| 5,805,223 A | 9/1998 | Shikakura et al. | | 6,100,108 A | 8/2000 | Mizuno et al. |
| 5,811,177 A | 9/1998 | Shi et al. | | 6,106,933 A | 8/2000 | Nagai et al. |
| 5,814,195 A | 9/1998 | Lehan et al. | | 6,110,531 A | 8/2000 | Paz De Araujo |
| 5,830,330 A | 11/1998 | Lantsman | | 6,115,616 A | 9/2000 | Halperin et al. |
| 5,831,262 A | 11/1998 | Greywall et al. | | 6,117,279 A | 9/2000 | Smolanoff et al. |
| 5,834,137 A | 11/1998 | Zhang et al. | | 6,118,426 A | 9/2000 | Albert et al. |
| 5,841,931 A | 11/1998 | Foresi et al. | | 6,120,890 A | 9/2000 | Chen et al. |
| 5,842,118 A | 11/1998 | Wood, Jr. | | 6,129,277 A | 10/2000 | Grant et al. |
| 5,845,990 A | 12/1998 | Hymer | | 6,133,670 A | 10/2000 | Rodgers et al. |
| 5,847,865 A | 12/1998 | Gopinath et al. | | 6,137,671 A | 10/2000 | Staffiere |
| 5,849,163 A | 12/1998 | Ichikawa et al. | | 6,144,916 A | 11/2000 | Wood, Jr. et al. |
| 5,851,896 A | 12/1998 | Summerfelt | | 6,146,225 A | 11/2000 | Sheats et al. |
| 5,853,830 A | 12/1998 | McCaulley et al. | | 6,148,503 A | 11/2000 | Delnick et al. |
| 5,855,744 A | 1/1999 | Halsey et al. | | 6,156,452 A | 12/2000 | Kozuki et al. |
| 5,856,705 A | 1/1999 | Ting | | 6,157,765 A | 12/2000 | Bruce et al. |
| 5,864,182 A | 1/1999 | Matsuzaki | | 6,159,635 A | 12/2000 | Dasgupta et al. |
| 5,865,860 A | 2/1999 | Delnick | | 6,160,373 A | 12/2000 | Dunn et al. |
| 5,870,273 A | 2/1999 | Sogabe et al. | | 6,162,709 A | 12/2000 | Raoux et al. |
| 5,874,184 A | 2/1999 | Takeuchi et al. | | 6,165,566 A | 12/2000 | Tropsha |
| 5,882,721 A | 3/1999 | Delnick | | 6,168,884 B1 | 1/2001 | Neudecker et al. |
| 5,882,946 A | 3/1999 | Otani | | 6,169,474 B1 | 1/2001 | Greeff et al. |
| 5,889,383 A | 3/1999 | Teich | | 6,175,075 B1 | 1/2001 | Shiotsuka et al. |
| 5,895,731 A | 4/1999 | Clingempeel | | 6,176,986 B1 | 1/2001 | Watanabe et al. |
| 5,897,522 A | 4/1999 | Nitzan | | 6,181,283 B1 | 1/2001 | Johnson et al. |
| 5,900,057 A | 5/1999 | Buchal et al. | | 6,192,222 B1 | 2/2001 | Greeff et al. |
| 5,909,346 A | 6/1999 | Malhotra et al. | | 6,197,167 B1 | 3/2001 | Tanaka |
| 5,916,704 A | 6/1999 | Lewin et al. | | 6,198,217 B1 | 3/2001 | Suzuki et al. |
| 5,923,964 A | 7/1999 | Li | | 6,204,111 B1 | 3/2001 | Uemoto et al. |
| 5,930,046 A | 7/1999 | Solberg et al. | | 6,210,544 B1 | 4/2001 | Sasaki |
| 5,930,584 A | 7/1999 | Sun et al. | | 6,210,832 B1 | 4/2001 | Visco et al. |
| 5,942,089 A | 8/1999 | Sproul et al. | | 6,214,061 B1 | 4/2001 | Visco et al. |
| 5,948,215 A | 9/1999 | Lantsmann | | 6,214,660 B1 | 4/2001 | Uemoto et al. |
| 5,948,464 A | 9/1999 | Delnick | | 6,218,049 B1 | 4/2001 | Bates et al. |
| 5,948,562 A | 9/1999 | Fulcher et al. | | 6,220,516 B1 | 4/2001 | Tuttle et al. |
| 5,952,778 A | 9/1999 | Haskal et al. | | 6,223,317 B1 | 4/2001 | Pax et al. |
| 5,955,217 A | 9/1999 | Van Lerberghe | | 6,228,532 B1 | 5/2001 | Tsuji et al. |
| 5,961,672 A | 10/1999 | Skotheim et al. | | 6,229,987 B1 | 5/2001 | Greeff et al. |
| 5,961,682 A | 10/1999 | Lee et al. | | 6,232,242 B1 | 5/2001 | Hata et al. |
| 5,966,491 A | 10/1999 | DiGiovanni | | 6,235,432 B1 | 5/2001 | Kono et al. |
| 5,970,393 A | 10/1999 | Khorrami et al. | | 6,236,793 B1 | 5/2001 | Lawrence et al. |
| 5,973,913 A | 10/1999 | McEwen et al. | | 6,242,128 B1 | 6/2001 | Tura et al. |
| 5,977,582 A | 11/1999 | Flemming et al. | | 6,242,129 B1 | 6/2001 | Johnson |
| 5,982,144 A | 11/1999 | Johnson et al. | | 6,242,132 B1 | 6/2001 | Neudecker et al. |
| 5,985,484 A | 11/1999 | Young et al. | | 6,248,291 B1 | 6/2001 | Nakagama et al. |

| Patent | Kind | Date | Inventor |
|---|---|---|---|
| 6,248,481 | B1 | 6/2001 | Visco et al. |
| 6,248,640 | B1 | 6/2001 | Nam |
| 6,249,222 | B1 | 6/2001 | Gehlot |
| 6,252,564 | B1 | 6/2001 | Albert et al. |
| 6,258,252 | B1 | 7/2001 | Miyasaka et al. |
| 6,261,917 | B1 | 7/2001 | Quek et al. |
| 6,264,709 | B1 | 7/2001 | Yoon et al. |
| 6,265,652 | B1 | 7/2001 | Kurata et al. |
| 6,268,695 | B1 | 7/2001 | Affinito |
| 6,271,053 | B1 | 8/2001 | Kondo |
| 6,271,793 | B1 | 8/2001 | Brady et al. |
| 6,271,801 | B2 | 8/2001 | Tuttle et al. |
| 6,280,585 | B1 | 8/2001 | Obinata |
| 6,280,875 | B1 | 8/2001 | Kwak et al. |
| 6,281,142 | B1 | 8/2001 | Basceri |
| 6,284,406 | B1 | 9/2001 | Xing et al. |
| 6,287,986 | B1 | 9/2001 | Mihara |
| 6,289,209 | B1 | 9/2001 | Wood, Jr. |
| 6,290,821 | B1 | 9/2001 | McLeod |
| 6,290,822 | B1 | 9/2001 | Fleming et al. |
| 6,291,098 | B1 | 9/2001 | Shibuya et al. |
| 6,294,722 | B1 | 9/2001 | Kondo et al. |
| 6,296,949 | B1 | 10/2001 | Bergstresser et al. |
| 6,296,967 | B1 | 10/2001 | Jacobs et al. |
| 6,296,971 | B1 | 10/2001 | Hara |
| 6,300,215 | B1 | 10/2001 | Shin |
| 6,302,939 | B1 | 10/2001 | Rabin |
| 6,306,265 | B1 | 10/2001 | Fu et al. |
| 6,316,563 | B2 | 11/2001 | Naijo et al. |
| 6,323,416 | B1 | 11/2001 | Komori et al. |
| 6,324,211 | B1 | 11/2001 | Ovard et al. |
| 6,325,294 | B2 | 12/2001 | Tuttle et al. |
| 6,329,213 | B1 | 12/2001 | Tuttle et al. |
| 6,339,236 | B1 | 1/2002 | Tomii et al. |
| 6,340,880 | B1 | 1/2002 | Higashijima et al. |
| 6,344,366 | B1 | 2/2002 | Bates |
| 6,344,419 | B1 | 2/2002 | Forster et al. |
| 6,344,795 | B1 | 2/2002 | Gehlot |
| 6,350,353 | B2 | 2/2002 | Gopalraja et al. |
| 6,351,630 | B2 | 2/2002 | Wood, Jr. |
| 6,356,230 | B1 | 3/2002 | Greef et al. |
| 6,356,694 | B1 | 3/2002 | Weber |
| 6,356,764 | B1 | 3/2002 | Ovard et al. |
| 6,358,810 | B1 | 3/2002 | Dornfest et al. |
| 6,360,954 | B1 | 3/2002 | Barnardo |
| 6,361,662 | B1 | 3/2002 | Chiba et al. |
| 6,365,300 | B1 | 4/2002 | Ota et al. |
| 6,365,319 | B1 | 4/2002 | Heath et al. |
| 6,368,275 | B1 | 4/2002 | Sliwa et al. |
| 6,369,316 | B1 | 4/2002 | Plessing et al. |
| 6,372,383 | B1 | 4/2002 | Lee et al. |
| 6,372,386 | B1 | 4/2002 | Cho et al. |
| 6,373,224 | B1 | 4/2002 | Goto et al. |
| 6,375,780 | B1 | 4/2002 | Tuttle et al. |
| 6,376,027 | B1 | 4/2002 | Lee et al. |
| 6,379,835 | B1 | 4/2002 | Kucherovsky et al. |
| 6,379,842 | B1 | 4/2002 | Mayer |
| 6,379,846 | B1 | 4/2002 | Terahara et al. |
| 6,380,477 | B1 | 4/2002 | Curtin |
| 6,384,573 | B1 | 5/2002 | Dunn |
| 6,387,563 | B1 | 5/2002 | Bates |
| 6,391,166 | B1 | 5/2002 | Wang |
| 6,392,565 | B1 | 5/2002 | Brown |
| 6,394,598 | B1 | 5/2002 | Kaiser |
| 6,395,430 | B1 | 5/2002 | Cho et al. |
| 6,396,001 | B1 | 5/2002 | Nakamura |
| 6,398,824 | B1 | 6/2002 | Johnson |
| 6,399,241 | B1 | 6/2002 | Hara et al. |
| 6,402,039 | B1 | 6/2002 | Freeman et al. |
| 6,402,795 | B1 | 6/2002 | Chu et al. |
| 6,402,796 | B1 | 6/2002 | Johnson |
| 6,409,965 | B1 | 6/2002 | Nagata et al. |
| 6,413,284 | B1 * | 7/2002 | Chu et al. .................. 29/623.1 |
| 6,413,285 | B1 | 7/2002 | Chu et al. |
| 6,413,382 | B1 | 7/2002 | Wang et al. |
| 6,413,645 | B1 | 7/2002 | Graff et al. |
| 6,413,676 | B1 | 7/2002 | Munshi |
| 6,414,626 | B1 | 7/2002 | Greeff et al. |
| 6,416,598 | B1 | 7/2002 | Sircar |
| 6,420,961 | B1 | 7/2002 | Bates et al. |
| 6,422,698 | B2 | 7/2002 | Kaiser |
| 6,423,106 | B1 | 7/2002 | Bates |
| 6,423,776 | B1 | 7/2002 | Akkapeddi et al. |
| 6,426,163 | B1 | 7/2002 | Pasquier et al. |
| 6,432,577 | B1 | 8/2002 | Shul et al. |
| 6,432,584 | B1 | 8/2002 | Visco et al. |
| 6,433,380 | B2 | 8/2002 | Shin |
| 6,433,465 | B1 | 8/2002 | McKnight et al. |
| 6,436,156 | B1 | 8/2002 | Wandeloski et al. |
| 6,437,231 | B2 | 8/2002 | Kurata et al. |
| 6,444,336 | B1 | 9/2002 | Jia et al. |
| 6,444,355 | B1 | 9/2002 | Murai et al. |
| 6,444,368 | B1 | 9/2002 | Hikmet et al. |
| 6,444,750 | B1 | 9/2002 | Touhsaent |
| 6,459,418 | B1 | 10/2002 | Comiskey et al. |
| 6,459,726 | B1 | 10/2002 | Ovard et al. |
| 6,466,771 | B2 | 10/2002 | Wood, Jr. |
| 6,475,668 | B1 | 11/2002 | Hosokawa et al. |
| 6,480,699 | B1 | 11/2002 | Lovoi |
| 6,481,623 | B1 | 11/2002 | Grant et al. |
| 6,488,822 | B1 | 12/2002 | Moslehi |
| 6,494,999 | B1 | 12/2002 | Herrera et al. |
| 6,495,283 | B1 | 12/2002 | Yoon et al. |
| 6,497,598 | B2 | 12/2002 | Affinito |
| 6,500,287 | B1 | 12/2002 | Azens et al. |
| 6,503,661 | B1 | 1/2003 | Park et al. |
| 6,503,831 | B2 | 1/2003 | Speakman |
| 6,506,289 | B2 | 1/2003 | Demaray et al. |
| 6,511,516 | B1 | 1/2003 | Johnson et al. |
| 6,511,615 | B1 | 1/2003 | Dawes et al. |
| 6,517,968 | B2 | 2/2003 | Johnson et al. |
| 6,522,067 | B1 | 2/2003 | Graff et al. |
| 6,524,466 | B1 | 2/2003 | Bonaventura et al. |
| 6,524,750 | B1 | 2/2003 | Mansuetto |
| 6,525,976 | B1 | 2/2003 | Johnson |
| 6,528,212 | B1 | 3/2003 | Kusumoto et al. |
| 6,529,827 | B1 | 3/2003 | Beason et al. |
| 6,533,907 | B2 | 3/2003 | Demaray et al. |
| 6,537,428 | B1 | 3/2003 | Xiong et al. |
| 6,538,211 | B2 | 3/2003 | St. Lawrence et al. |
| 6,541,147 | B1 | 4/2003 | McLean et al. |
| 6,548,912 | B1 | 4/2003 | Graff et al. |
| 6,551,745 | B2 | 4/2003 | Moutsios et al. |
| 6,558,836 | B1 | 5/2003 | Whitacre et al. |
| 6,562,513 | B1 | 5/2003 | Takeuchi et al. |
| 6,563,998 | B1 | 5/2003 | Farah et al. |
| 6,569,564 | B1 | 5/2003 | Lane |
| 6,569,570 | B2 | 5/2003 | Sonobe et al. |
| 6,570,325 | B2 | 5/2003 | Graff et al. |
| 6,572,173 | B2 | 6/2003 | Muller |
| 6,573,652 | B1 | 6/2003 | Graff et al. |
| 6,576,546 | B2 | 6/2003 | Gilbert et al. |
| 6,579,728 | B2 | 6/2003 | Grant et al. |
| 6,582,480 | B2 | 6/2003 | Pasquier et al. |
| 6,582,481 | B1 | 6/2003 | Erbil |
| 6,582,852 | B1 | 6/2003 | Gao et al. |
| 6,589,299 | B2 | 7/2003 | Missling et al. |
| 6,593,150 | B2 | 7/2003 | Ramberg et al. |
| 6,599,662 | B1 | 7/2003 | Chiang et al. |
| 6,600,905 | B2 | 7/2003 | Greeff et al. |
| 6,602,338 | B2 | 8/2003 | Chen et al. |
| 6,603,139 | B1 | 8/2003 | Tessler et al. |
| 6,603,391 | B1 | 8/2003 | Greeff et al. |
| 6,605,228 | B1 | 8/2003 | Kawaguchi et al. |
| 6,608,464 | B1 | 8/2003 | Lew et al. |
| 6,608,470 | B1 | 8/2003 | Oglesbee et al. |
| 6,610,440 | B1 | 8/2003 | LaFollette et al. |
| 6,615,614 | B1 | 9/2003 | Makikawa et al. |
| 6,616,035 | B2 | 9/2003 | Ehrensvard et al. |
| 6,618,829 | B2 | 9/2003 | Pax et al. |
| 6,620,545 | B2 | 9/2003 | Goenka et al. |
| 6,622,049 | B2 | 9/2003 | Penner et al. |
| 6,632,563 | B1 | 10/2003 | Krasnov et al. |
| 6,637,906 | B2 | 10/2003 | Knoerzer et al. |
| 6,637,916 | B2 | 10/2003 | Mullner |
| 6,639,578 | B1 | 10/2003 | Comiskey et al. |
| 6,642,895 | B2 | 11/2003 | Zurcher et al. |
| 6,645,675 | B1 | 11/2003 | Munshi |

| | | | | | | |
|---|---|---|---|---|---|---|
| 6,650,000 B2 | 11/2003 | Ballantine et al. | 6,986,965 B2 | 1/2006 | Jenson et al. |
| 6,650,942 B2 | 11/2003 | Howard et al. | 6,994,933 B1 | 2/2006 | Bates |
| 6,662,430 B2 | 12/2003 | Brady et al. | 7,022,431 B2 | 4/2006 | Shchori et al. |
| 6,664,006 B1 | 12/2003 | Munshi | 7,033,406 B2 | 4/2006 | Weir et al. |
| 6,673,484 B2 | 1/2004 | Matsuura | 7,045,246 B2 | 5/2006 | Simburger et al. |
| 6,673,716 B1 | 1/2004 | D'Couto et al. | 7,045,372 B2 | 5/2006 | Ballantine et al. |
| 6,674,159 B1 | 1/2004 | Peterson et al. | 7,056,620 B2 | 6/2006 | Krasnov et al. |
| 6,677,070 B2 | 1/2004 | Kearl | 7,073,723 B2 | 7/2006 | Fürst et al. |
| 6,683,244 B2 | 1/2004 | Fujimori et al. | 7,095,372 B2 | 8/2006 | Soler Castany et al. |
| 6,683,749 B2 | 1/2004 | Daby et al. | 7,129,166 B2 | 10/2006 | Speakman |
| 6,686,096 B1 | 2/2004 | Chung | 7,131,189 B2 | 11/2006 | Jenson |
| 6,693,840 B2 | 2/2004 | Shimada et al. | 7,144,654 B2 | 12/2006 | LaFollette et al. |
| 6,700,491 B2 | 3/2004 | Shafer | 7,144,655 B2 | 12/2006 | Jenson et al. |
| 6,706,449 B2 | 3/2004 | Mikhaylik et al. | 7,157,187 B2 | 1/2007 | Jenson |
| 6,709,778 B2 | 3/2004 | Johnson | 7,158,031 B2 | 1/2007 | Tuttle |
| 6,713,216 B2 | 3/2004 | Kugai et al. | 7,162,392 B2 | 1/2007 | Vock et al. |
| 6,713,389 B2 | 3/2004 | Speakman | 7,183,693 B2 | 2/2007 | Brantner et al. |
| 6,713,987 B2 | 3/2004 | Krasnov et al. | 7,186,479 B2 | 3/2007 | Krasnov et al. |
| 6,723,140 B2 | 4/2004 | Chu et al. | 7,194,801 B2 | 3/2007 | Jenson et al. |
| 6,730,423 B2 | 5/2004 | Einhart et al. | 7,198,832 B2 | 4/2007 | Burrows et al. |
| 6,733,924 B1 | 5/2004 | Skotheim et al. | 7,202,825 B2 | 4/2007 | Leizerovich et al. |
| 6,737,197 B2 | 5/2004 | Chu et al. | 7,220,517 B2 | 5/2007 | Park et al. |
| 6,737,789 B2 | 5/2004 | Radziemski et al. | 7,230,321 B2 | 6/2007 | McCain |
| 6,741,178 B1 | 5/2004 | Tuttle | 7,247,408 B2 | 7/2007 | Skotheim et al. |
| 6,750,156 B2 | 6/2004 | Le et al. | 7,253,494 B2 | 8/2007 | Mino et al. |
| 6,752,842 B2 | 6/2004 | Luski et al. | 7,265,674 B2 | 9/2007 | Tuttle |
| 6,753,108 B1 | 6/2004 | Hampden-Smith et al. | 7,267,904 B2 | 9/2007 | Komatsu et al. |
| 6,753,114 B2 | 6/2004 | Jacobs et al. | 7,267,906 B2 | 9/2007 | Mizuta et al. |
| 6,760,520 B1 | 7/2004 | Medin et al. | 7,273,682 B2 | 9/2007 | Park et al. |
| 6,764,525 B1 | 7/2004 | Whitacre et al. | 7,274,118 B2 | 9/2007 | Jenson et al. |
| 6,768,246 B2 | 7/2004 | Pelrine et al. | 7,288,340 B2 | 10/2007 | Iwamoto |
| 6,768,855 B1 | 7/2004 | Bakke et al. | 7,316,867 B2 | 1/2008 | Park et al. |
| 6,770,176 B2 | 8/2004 | Benson et al. | 7,323,634 B2 | 1/2008 | Speakman |
| 6,773,848 B1 | 8/2004 | Nortoft et al. | 7,332,363 B2 | 2/2008 | Edwards |
| 6,780,208 B2 | 8/2004 | Hopkins et al. | 7,335,441 B2 | 2/2008 | Luski et al. |
| 6,797,428 B1 | 9/2004 | Skotheim et al. | RE40,137 E | 3/2008 | Tuttle et al. |
| 6,797,429 B1 | 9/2004 | Komatsu | 7,345,647 B1 | 3/2008 | Rodenbeck |
| 6,805,998 B2 | 10/2004 | Jensen et al. | 7,348,099 B2 | 3/2008 | Mukai et al. |
| 6,805,999 B2 | 10/2004 | Lee et al. | 7,389,580 B2 | 6/2008 | Jenson et al. |
| 6,818,356 B1 | 11/2004 | Bates | 7,400,253 B2 | 7/2008 | Cohen |
| 6,822,157 B2 | 11/2004 | Fujioka | 7,410,730 B2 | 8/2008 | Bates |
| 6,824,922 B2 | 11/2004 | Park et al. | RE40,531 E | 10/2008 | Graff et al. |
| 6,827,826 B2 | 12/2004 | Demaray et al. | 7,466,274 B2 | 12/2008 | Lin et al. |
| 6,828,063 B2 | 12/2004 | Park et al. | 7,468,221 B2 | 12/2008 | LaFollette et al. |
| 6,828,065 B2 | 12/2004 | Munshi | 7,494,742 B2 | 2/2009 | Tarnowski et al. |
| 6,830,846 B2 | 12/2004 | Kramlich et al. | 7,670,724 B1 | 3/2010 | Chan et al. |
| 6,835,493 B2 | 12/2004 | Zhang et al. | 7,848,715 B2 | 12/2010 | Boos |
| 6,838,209 B2 | 1/2005 | Langan et al. | 7,858,223 B2 | 12/2010 | Visco et al. |
| 6,846,765 B2 | 1/2005 | Imamura et al. | 7,993,773 B2 | 8/2011 | Snyder et al. |
| 6,852,139 B2 | 2/2005 | Zhang et al. | 8,010,048 B2 | 8/2011 | Brommer et al. |
| 6,855,441 B1 | 2/2005 | Levanon | 8,021,778 B2 | 9/2011 | Snyder et al. |
| 6,861,821 B2 | 3/2005 | Masumoto et al. | 8,056,814 B2 | 11/2011 | Martin et al. |
| 6,863,699 B1 | 3/2005 | Krasnov et al. | 8,236,443 B2 | 8/2012 | Snyder et al. |
| 6,866,901 B2 | 3/2005 | Burrows et al. | 2001/0005561 A1 | 6/2001 | Yamada et al. |
| 6,866,963 B2 | 3/2005 | Seung et al. | 2001/0027159 A1 | 10/2001 | Kaneyoshi |
| 6,869,722 B2 | 3/2005 | Kearl | 2001/0031122 A1 | 10/2001 | Lackritz et al. |
| 6,884,327 B2 | 4/2005 | Pan et al. | 2001/0032666 A1 | 10/2001 | Jenson et al. |
| 6,886,240 B2 | 5/2005 | Zhang et al. | 2001/0033952 A1 | 10/2001 | Jenson et al. |
| 6,890,385 B2 | 5/2005 | Tsuchiya et al. | 2001/0034106 A1 | 10/2001 | Moise et al. |
| 6,896,992 B2 | 5/2005 | Kearl | 2001/0041294 A1 | 11/2001 | Chu et al. |
| 6,899,975 B2 | 5/2005 | Watanabe et al. | 2001/0041460 A1 | 11/2001 | Wiggins |
| 6,902,660 B2 | 6/2005 | Lee et al. | 2001/0052752 A1 | 12/2001 | Ghosh et al. |
| 6,905,578 B1 | 6/2005 | Moslehi et al. | 2001/0054437 A1 | 12/2001 | Komori et al. |
| 6,906,436 B2 | 6/2005 | Jensen et al. | 2001/0055719 A1 | 12/2001 | Akashi et al. |
| 6,911,667 B2 | 6/2005 | Pichler et al. | 2002/0000034 A1 | 1/2002 | Jenson |
| 6,916,679 B2 | 7/2005 | Snyder et al. | 2002/0001746 A1 | 1/2002 | Jenson |
| 6,921,464 B2 | 7/2005 | Krasnov et al. | 2002/0001747 A1 | 1/2002 | Jenson |
| 6,923,702 B2 | 8/2005 | Graff et al. | 2002/0004167 A1 | 1/2002 | Jenson et al. |
| 6,924,164 B2 | 8/2005 | Jensen | 2002/0009630 A1 | 1/2002 | Gao et al. |
| 6,929,879 B2 | 8/2005 | Yamazaki | 2002/0019296 A1 | 2/2002 | Freeman et al. |
| 6,936,377 B2 | 8/2005 | Wensley et al. | 2002/0028377 A1 | 3/2002 | Gross |
| 6,936,381 B2 | 8/2005 | Skotheim et al. | 2002/0033330 A1 | 3/2002 | Demaray et al. |
| 6,936,407 B2 | 8/2005 | Pichler | 2002/0037756 A1 | 3/2002 | Jacobs et al. |
| 6,949,389 B2 | 9/2005 | Pichler et al. | 2002/0066539 A1 | 6/2002 | Muller |
| 6,955,986 B2 | 10/2005 | Li | 2002/0067615 A1 | 6/2002 | Muller |
| 6,962,613 B2 | 11/2005 | Jenson | 2002/0071989 A1 | 6/2002 | Verma et al. |
| 6,962,671 B2 | 11/2005 | Martin et al. | 2002/0076133 A1 | 6/2002 | Li et al. |
| 6,964,829 B2 | 11/2005 | Utsugi et al. | 2002/0090758 A1 | 7/2002 | Henley et al. |
| 6,982,132 B1 | 1/2006 | Goldner et al. | 2002/0091929 A1 | 7/2002 | Ehrensvard |

| | | |
|---|---|---|
| 2002/0093029 A1 | 7/2002 | Ballantine et al. |
| 2002/0106297 A1 | 8/2002 | Ueno et al. |
| 2002/0110733 A1 | 8/2002 | Johnson |
| 2002/0115252 A1 | 8/2002 | Haukka et al. |
| 2002/0134671 A1 | 9/2002 | Demaray et al. |
| 2002/0139662 A1 | 10/2002 | Lee |
| 2002/0140103 A1 | 10/2002 | Kloster et al. |
| 2002/0159245 A1 | 10/2002 | Murasko et al. |
| 2002/0161404 A1 | 10/2002 | Schmidt |
| 2002/0164441 A1 | 11/2002 | Amine et al. |
| 2002/0170821 A1 | 11/2002 | Sandlin et al. |
| 2002/0170960 A1 | 11/2002 | Ehrensvard et al. |
| 2003/0019326 A1 | 1/2003 | Han et al. |
| 2003/0022487 A1 | 1/2003 | Yoon et al. |
| 2003/0024994 A1 | 2/2003 | Ladyansky |
| 2003/0029493 A1 | 2/2003 | Plessing |
| 2003/0030589 A1 | 2/2003 | Zurcher et al. |
| 2003/0035906 A1 | 2/2003 | Memarian et al. |
| 2003/0036003 A1 | 2/2003 | Shchori et al. |
| 2003/0042131 A1 | 3/2003 | Johnson |
| 2003/0044665 A1 | 3/2003 | Rastegar et al. |
| 2003/0048635 A1 | 3/2003 | Knoerzer et al. |
| 2003/0057423 A1 | 3/2003 | Shimoda et al. |
| 2003/0063883 A1 | 4/2003 | Demaray et al. |
| 2003/0064292 A1* | 4/2003 | Neudecker et al. ........... 429/235 |
| 2003/0068559 A1 | 4/2003 | Armstrong et al. |
| 2003/0076642 A1 | 4/2003 | Shiner et al. |
| 2003/0077914 A1 | 4/2003 | Le et al. |
| 2003/0079838 A1 | 5/2003 | Brcka |
| 2003/0091904 A1 | 5/2003 | Munshi |
| 2003/0095463 A1 | 5/2003 | Shimada et al. |
| 2003/0097858 A1 | 5/2003 | Strohhofer et al. |
| 2003/0109903 A1 | 6/2003 | Berrang et al. |
| 2003/0127319 A1 | 7/2003 | Demaray et al. |
| 2003/0134054 A1 | 7/2003 | Demaray et al. |
| 2003/0141186 A1 | 7/2003 | Wang et al. |
| 2003/0143853 A1 | 7/2003 | Celii et al. |
| 2003/0146877 A1 | 8/2003 | Mueller |
| 2003/0152829 A1 | 8/2003 | Zhang et al. |
| 2003/0162094 A1 | 8/2003 | Lee et al. |
| 2003/0173207 A1 | 9/2003 | Zhang et al. |
| 2003/0173208 A1 | 9/2003 | Pan et al. |
| 2003/0174391 A1 | 9/2003 | Pan et al. |
| 2003/0175142 A1 | 9/2003 | Milonopoulou et al. |
| 2003/0178623 A1 | 9/2003 | Nishiki et al. |
| 2003/0178637 A1 | 9/2003 | Chen et al. |
| 2003/0180610 A1 | 9/2003 | Felde et al. |
| 2003/0185266 A1 | 10/2003 | Henrichs |
| 2003/0231106 A1 | 12/2003 | Shafer |
| 2003/0232248 A1 | 12/2003 | Iwamoto et al. |
| 2004/0008587 A1 | 1/2004 | Siebott et al. |
| 2004/0015735 A1 | 1/2004 | Norman |
| 2004/0023106 A1 | 2/2004 | Benson et al. |
| 2004/0028875 A1 | 2/2004 | Van Rijn et al. |
| 2004/0029311 A1 | 2/2004 | Snyder et al. |
| 2004/0038050 A1 | 2/2004 | Saijo et al. |
| 2004/0043557 A1 | 3/2004 | Haukka et al. |
| 2004/0048157 A1 | 3/2004 | Neudecker et al. |
| 2004/0053124 A1 | 3/2004 | LaFollette et al. |
| 2004/0058237 A1 | 3/2004 | Higuchi et al. |
| 2004/0072067 A1* | 4/2004 | Minami et al. ................. 429/212 |
| 2004/0077161 A1 | 4/2004 | Chen et al. |
| 2004/0078662 A1 | 4/2004 | Hamel et al. |
| 2004/0081415 A1 | 4/2004 | Demaray et al. |
| 2004/0081860 A1 | 4/2004 | Hundt et al. |
| 2004/0085002 A1 | 5/2004 | Pearce |
| 2004/0101761 A1 | 5/2004 | Park et al. |
| 2004/0105644 A1 | 6/2004 | Dawes |
| 2004/0106038 A1 | 6/2004 | Shimamura et al. |
| 2004/0106045 A1 | 6/2004 | Ugaji |
| 2004/0106046 A1 | 6/2004 | Inda |
| 2004/0118700 A1 | 6/2004 | Schierle-Arndt et al. |
| 2004/0126305 A1 | 7/2004 | Chen et al. |
| 2004/0151986 A1 | 8/2004 | Park et al. |
| 2004/0161640 A1 | 8/2004 | Salot |
| 2004/0175624 A1 | 9/2004 | Luski et al. |
| 2004/0188239 A1 | 9/2004 | Robison et al. |
| 2004/0209159 A1 | 10/2004 | Lee et al. |
| 2004/0212276 A1 | 10/2004 | Brantner et al. |
| 2004/0214079 A1 | 10/2004 | Simburger et al. |
| 2004/0219434 A1 | 11/2004 | Benson et al. |
| 2004/0245561 A1 | 12/2004 | Sakashita et al. |
| 2004/0258984 A1 | 12/2004 | Ariel et al. |
| 2004/0259305 A1 | 12/2004 | Demaray et al. |
| 2005/0000794 A1 | 1/2005 | Demaray et al. |
| 2005/0006768 A1 | 1/2005 | Narasimhan et al. |
| 2005/0048802 A1 | 3/2005 | Zhang et al. |
| 2005/0070097 A1 | 3/2005 | Barmak et al. |
| 2005/0072458 A1 | 4/2005 | Goldstein |
| 2005/0079418 A1 | 4/2005 | Kelley et al. |
| 2005/0095506 A1 | 5/2005 | Klaassen |
| 2005/0105231 A1 | 5/2005 | Hamel et al. |
| 2005/0110457 A1 | 5/2005 | LaFollette et al. |
| 2005/0112461 A1 | 5/2005 | Amine et al. |
| 2005/0118464 A1 | 6/2005 | Levanon |
| 2005/0130032 A1 | 6/2005 | Krasnov et al. |
| 2005/0133361 A1 | 6/2005 | Ding et al. |
| 2005/0141170 A1 | 6/2005 | Honda et al. |
| 2005/0142447 A1 | 6/2005 | Nakai et al. |
| 2005/0147877 A1 | 7/2005 | Tarnowski et al. |
| 2005/0158622 A1 | 7/2005 | Mizuta et al. |
| 2005/0170736 A1 | 8/2005 | Cok |
| 2005/0175891 A1 | 8/2005 | Kameyama et al. |
| 2005/0176181 A1 | 8/2005 | Burrows et al. |
| 2005/0181280 A1 | 8/2005 | Ceder et al. |
| 2005/0183946 A1 | 8/2005 | Pan et al. |
| 2005/0186469 A1 | 8/2005 | De Jonghe et al. |
| 2005/0189139 A1 | 9/2005 | Stole |
| 2005/0208371 A1 | 9/2005 | Kim et al. |
| 2005/0239917 A1 | 10/2005 | Nelson et al. |
| 2005/0255828 A1 | 11/2005 | Fisher |
| 2005/0266161 A1 | 12/2005 | Medeiros et al. |
| 2006/0019504 A1 | 1/2006 | Taussig |
| 2006/0021214 A1 | 2/2006 | Jenson et al. |
| 2006/0021261 A1 | 2/2006 | Face |
| 2006/0040177 A1 | 2/2006 | Onodera et al. |
| 2006/0046907 A1 | 3/2006 | Rastegar et al. |
| 2006/0054496 A1 | 3/2006 | Zhang et al. |
| 2006/0057283 A1 | 3/2006 | Zhang et al. |
| 2006/0057304 A1 | 3/2006 | Zhang et al. |
| 2006/0063074 A1 | 3/2006 | Jenson et al. |
| 2006/0071592 A1 | 4/2006 | Narasimhan et al. |
| 2006/0134522 A1 | 6/2006 | Zhang et al. |
| 2006/0155545 A1 | 7/2006 | Jayne |
| 2006/0201583 A1 | 9/2006 | Michaluk et al. |
| 2006/0210779 A1 | 9/2006 | Weir et al. |
| 2006/0222954 A1 | 10/2006 | Skotheim et al. |
| 2006/0234130 A1 | 10/2006 | Inda |
| 2006/0237543 A1 | 10/2006 | Goto et al. |
| 2006/0255435 A1 | 11/2006 | Fuergut et al. |
| 2006/0286448 A1 | 12/2006 | Snyder et al. |
| 2007/0009802 A1 | 1/2007 | Lee et al. |
| 2007/0021156 A1 | 1/2007 | Hoong et al. |
| 2007/0023275 A1 | 2/2007 | Tanase et al. |
| 2007/0037058 A1 | 2/2007 | Visco et al. |
| 2007/0053139 A1 | 3/2007 | Zhang et al. |
| 2007/0064396 A1 | 3/2007 | Oman |
| 2007/0087230 A1 | 4/2007 | Jenson et al. |
| 2007/0091543 A1 | 4/2007 | Gasse et al. |
| 2007/0125638 A1 | 6/2007 | Zhang et al. |
| 2007/0141468 A1 | 6/2007 | Barker |
| 2007/0148065 A1 | 6/2007 | Weir et al. |
| 2007/0148553 A1 | 6/2007 | Weppner |
| 2007/0151661 A1 | 7/2007 | Mao et al. |
| 2007/0164376 A1 | 7/2007 | Burrows et al. |
| 2007/0166612 A1 | 7/2007 | Krasnov et al. |
| 2007/0184345 A1 | 8/2007 | Neudecker et al. |
| 2007/0196682 A1 | 8/2007 | Visser et al. |
| 2007/0202395 A1 | 8/2007 | Snyder et al. |
| 2007/0205513 A1 | 9/2007 | Brunnbauer et al. |
| 2007/0210459 A1 | 9/2007 | Burrows et al. |
| 2007/0222681 A1 | 9/2007 | Greene et al. |
| 2007/0224951 A1 | 9/2007 | Gilb et al. |
| 2007/0229228 A1 | 10/2007 | Yamazaki et al. |
| 2007/0235320 A1 | 10/2007 | White et al. |
| 2007/0264564 A1 | 11/2007 | Johnson et al. |
| 2007/0278653 A1 | 12/2007 | Brunnbauer et al. |
| 2007/0298326 A1 | 12/2007 | Angell et al. |

| | | | | | |
|---|---|---|---|---|---|
| 2008/0003496 | A1 | 1/2008 | Neudecker et al. | JP | 2004-158268 | 6/2004 |
| 2008/0008936 | A1 | 1/2008 | Mizuta et al. | JP | 2004273436 | 9/2004 |
| 2008/0014501 | A1 | 1/2008 | Skotheim et al. | JP | 2005-256101 | 9/2005 |
| 2008/0057397 | A1 | 3/2008 | Skotheim et al. | JP | 2005-286011 A | 10/2005 |
| 2008/0150829 | A1 | 6/2008 | Lin et al. | JP | 2002-026412 | 2/2007 |
| 2008/0213672 | A1 | 9/2008 | Skotheim et al. | JP | 7-107752 | 4/2007 |
| 2008/0233708 | A1 | 9/2008 | Hisamatsu | KR | 20020007881 | 1/2002 |
| 2008/0254575 | A1 | 10/2008 | Fuergut et al. | KR | 20020017790 | 3/2002 |
| 2008/0261107 | A1 | 10/2008 | Snyder et al. | KR | 20020029813 | 4/2002 |
| 2008/0263855 | A1 | 10/2008 | Li et al. | KR | 20020038917 | 5/2002 |
| 2008/0286651 | A1 | 11/2008 | Neudecker et al. | KR | 20030033913 | 5/2003 |
| 2009/0092903 | A1 | 4/2009 | Johnson et al. | KR | 20030042288 | 5/2003 |
| 2009/0124201 | A1 | 5/2009 | Meskens | KR | 20030085252 | 11/2003 |
| 2009/0181303 | A1 | 7/2009 | Neudecker et al. | RU | 2241281 | 11/2004 |
| 2009/0302226 | A1 | 12/2009 | Schieber et al. | WO | WO 9513629 | 5/1995 |
| 2009/0308936 | A1 | 12/2009 | Nitzan et al. | WO | WO 9623085 | 8/1996 |
| 2009/0312069 | A1 | 12/2009 | Peng et al. | WO | WO 9623217 | 8/1996 |
| 2010/0001079 | A1 | 1/2010 | Martin et al. | WO | WO 9727344 | 7/1997 |
| 2010/0032001 | A1 | 2/2010 | Brantner | WO | WO 9735044 | 9/1997 |
| 2010/0086853 | A1 | 4/2010 | Venkatachalam et al. | WO | WO 9847196 | 10/1998 |
| 2011/0267235 | A1 | 11/2011 | Brommer et al. | WO | WO 9943034 | 8/1999 |
| 2011/0304430 | A1 | 12/2011 | Brommer et al. | WO | WO 9957770 | 11/1999 |

FOREIGN PATENT DOCUMENTS

| | | | | | |
|---|---|---|---|---|---|
| DE | 1984145 | 12/1999 | WO | WO 0021898 | 4/2000 |
| DE | 19824145 A1 | 12/1999 | WO | WO 0022742 | 4/2000 |
| DE | 10 2005 014 427 A1 | 9/2006 | WO | WO 0028607 | 5/2000 |
| DE | 10 2006 054 309 A1 | 11/2006 | WO | WO 0036665 | 6/2000 |
| DE | 10 2008 016 665 A1 | 10/2008 | WO | WO 0060682 | 10/2000 |
| DE | 102007030604 | 1/2009 | WO | WO 0060689 | 10/2000 |
| EP | 0 510 883 | 10/1992 | WO | WO 0062365 | 10/2000 |
| EP | 0 639 655 | 2/1995 | WO | WO 0101507 | 1/2001 |
| EP | 0 652 308 | 5/1995 | WO | WO 0117052 A2 | 3/2001 |
| EP | 0 820 088 | 1/1998 | WO | WO 0124303 | 4/2001 |
| EP | 1 068 899 | 1/2001 | WO | WO 0133651 A1 | 5/2001 |
| EP | 0 867 985 | 2/2001 | WO | WO 0139305 A1 | 5/2001 |
| EP | 1 092 689 | 4/2001 | WO | WO 0173864 A2 | 10/2001 |
| EP | 1 189 080 | 3/2002 | WO | WO 0173865 A2 | 10/2001 |
| EP | 1 713 024 A1 | 10/2006 | WO | WO 0173866 A2 | 10/2001 |
| FR | 2806198 | 9/2001 | WO | WO 0173868 A2 | 10/2001 |
| FR | 2 861 218 | 4/2005 | WO | WO 0173870 A2 | 10/2001 |
| JP | 55009305 | 1/1980 | WO | WO 0173883 A2 | 10/2001 |
| JP | 56-076060 | 6/1981 | WO | WO 0173957 A2 | 10/2001 |
| JP | 56156675 | 12/1981 | WO | WO 0182390 | 11/2001 |
| JP | 60068558 | 4/1985 | WO | 02 15301 A2 | 2/2002 |
| JP | 61-269072 | 11/1986 | WO | WO 0212932 | 2/2002 |
| JP | 62267944 | 11/1987 | WO | WO 0242516 | 5/2002 |
| JP | 63-290922 | 11/1988 | WO | WO 0247187 A1 | 6/2002 |
| JP | 2000-162234 | 11/1988 | WO | WO 02071506 | 9/2002 |
| JP | 2-054764 | 2/1990 | WO | WO 02101857 | 12/2002 |
| JP | 2230662 | 9/1990 | WO | WO 03003485 | 1/2003 |
| JP | 03-036962 | 2/1991 | WO | WO 03005477 | 1/2003 |
| JP | 4058456 | 2/1992 | WO | WO 03026039 | 3/2003 |
| JP | 4072049 | 3/1992 | WO | WO 03036670 | 5/2003 |
| JP | 6-010127 | 1/1994 | WO | WO 03069714 | 8/2003 |
| JP | 6-100333 | 4/1994 | WO | WO 03080325 | 10/2003 |
| JP | 7-233469 | 5/1995 | WO | WO 03083166 | 10/2003 |
| JP | 7-224379 | 8/1995 | WO | WO 2004012283 | 2/2004 |
| JP | 08-114408 | 5/1996 | WO | WO 2004021532 | 3/2004 |
| JP | 09-259932 A | 10/1997 | WO | WO 2004061887 | 7/2004 |
| JP | 10-026571 | 1/1998 | WO | WO 2004077519 | 9/2004 |
| JP | 10-239187 | 9/1998 | WO | WO 2004086550 | 10/2004 |
| JP | 11204088 | 7/1999 | WO | WO 2004093223 | 10/2004 |
| JP | 11-251518 A | 9/1999 | WO | WO 2004106581 | 12/2004 |
| JP | 2000144435 | 5/2000 | WO | WO 2004106582 | 12/2004 |
| JP | 2000188099 | 7/2000 | WO | WO 2005008828 | 1/2005 |
| JP | 2000268867 | 9/2000 | WO | WO 2005013394 | 2/2005 |
| JP | 2001-171812 | 6/2001 | WO | WO 2005038957 | 4/2005 |
| JP | 2001259494 | 9/2001 | WO | WO 2005067645 | 7/2005 |
| JP | 2001297764 | 10/2001 | WO | WO 2005085138 | 9/2005 |
| JP | 2001328198 | 11/2001 | WO | WO 2005091405 | 9/2005 |
| JP | 2002-140776 | 5/2002 | WO | WO 2006063308 | 6/2006 |
| JP | 2002-344115 | 11/2002 | WO | WO 2006085307 | 8/2006 |
| JP | 2003-17040 | 1/2003 | WO | WO 2007016781 | 2/2007 |
| JP | 2003-133420 A | 5/2003 | WO | WO 2007019855 | 2/2007 |
| JP | 2003347045 | 12/2003 | WO | WO 2007027535 | 3/2007 |
| JP | 2004071305 | 3/2004 | WO | WO 2007095604 A2 | 8/2007 |
| JP | 2004 146297 A | 5/2004 | WO | WO 2008036731 A2 | 3/2008 |
| JP | 2004149849 | 5/2004 | | | |

OTHER PUBLICATIONS

Abraham, K.M. et al., "Inorganic-organic composite solid polymer electrolytes," 147(4) J. Electrochem. Soc. 1251-56 (2000).
Abrahams, I., "$Li_6Zr_2O_7$, a new anion vacancy ccp based structure, determined by ab initio powder diffraction methods," 104 J. Solid State Chem. 397-403 (1993).
Amatucci, G. et al., "Lithium scandium phosphate-based electrolytes for solid state lithium rechargeable microbatteries," 60 Solid State Ionics 357-65 (1993).
Appetecchi, G.B. et al., "Composite polymer electrolytes with improved lithium metal electrode interfacial properties," 145(12) J. Electrochem. Soc. 4126-32 (1998).
Bates, J.B. et al., "Electrical properties of amorphous lithium electrolyte thin films," 53-56 Solid State Ionics 647-54 (1992).
Delmas, C. et al., "Des conducteurs ioniques pseudo-bidimensionnels $Li_8MO_6$ (M = Zr,Sn), $Li_7LO_6$ (L = Nb, Ta) et $Li_6In_2O_6$," 14 Mat. Res. Bull. 619-25 (1979).
Hu, Y-W. et al., "Ionic conductivity of lithium phosphate-doped lithium orthosilicate," 11 Mat. Res. Bull. 1227-30 (1976).
Neudecker, B. et al., "$Li_9SiAlO_8$: a lithium ion electrolyte for voltages above 5.4 V," 143(7) J. Electrochem. Soc. 2198-203 (1996).
Ohno, H. et al., "Electrical conductivity of a sintered pellet of octalithium zirconate," 132 J. Nucl. Mat. 222-30 (1985).
Scholder, V. et al., "Über Zirkonate, Hafnate und Thorate von Barium, Strontium, Lithium und Natrium," Zeitschrift für Anorganische und Allgemeine Chemie, Band 362, pp. 149-168 (1968).
Yu, X. et al., "A stable thin-film lithium electrolyte: lithium phosphorus oxynitride," 144(2) J. Electrochem. Soc. 524-532 (1997).
Affinito, J.D. et al., "PML/oxide/PML barrier layer performance differences arising from use of UV or electron beam polymerization of the PML layers," Thin Solid Films 308-309: 19-25 (1997).
Affinito, J.D. et al., "Polymer-oxide transparent barrier layers," Society of Vacuum Coaters, $39^{th}$ Ann. Technical Conference Proceedings, May 5-10, 1996, Philadelphia, PA, pp. 392-397 (1996).
Alder, T. et al., "High-efficiency fiber-to-chip coupling using low-loss tapered single-mode fiber," IEEE Photonics Tech. Lett. 12(8): 1016-1018 (2000).
Almeida, V.R. et al., "Nanotaper for compact mode conversion," Optics Letters 28(15): 1302-1304 (2003).
Anh et al., "Significant Suppression of Leakage Current in $(Ba,Sr)TiO_3$ Thin Films by Ni or Mn Doping," J. Appl. Phys.,92(5): 2651-2654 (Sep. 2002).
Asghari, M. and Dawnay, E., "ASOC™—a manufacturing integrated optics technology," SPIE 3620: 252-262 (Jan. 1999).
Barbier, D. et al., "Amplifying four-wavelength combiner, based on erbium/ytterbium-doped waveguide amplifiers and integrated splitters," IEEE Photonics Tech. Lett. 9:315-317 (1997).
Barbier, D., "Performances and potential applications of erbium doped planar waveguide amplifiers and lasers," Proc. OAA, Victoria, BC, Canada, pp. 58-63 (Jul. 21-23, 1997).
Beach R.J., "Theory and optimization of lens ducts," Applied Optics 35(12): 2005-2015 (1996).
Belkind, A. et al., "Pulsed-DC Reactive Sputtering of Dielectrics: Pulsing Parameter Effects," $43^{rd}$ Annual Technical Conference Proceedings (2000).
Belkind, A. et al., "Using pulsed direct current power for reactive sputtering of $Al_2O_3$," J. Vac. Sci. Technol. A 17(4): 1934-1940 (1999).
Bestwick, T., "ASOC™ silicon integrated optics technology," SPIE 3631: 182-190 (1999).
Borsella, E. et al., "Structural incorporation of silver in soda-lime glass by the ion-exchange process: a photoluminescence spectroscopy study," Applied Physics A 71: 125-132 (2000).
Byer, R.L., "Nonlinear optics and solid-state lasers: 2000," IEEE J. Selected Topics in Quantum Electronics 6(6): 911-930 (2000).
Campbell, S.A. et al., "Titanium dioxide (TiO2)-based gate insulators," IBM J. Res. Develop. 43(3): 383-392 (1999).
Chang, C.Y. and Sze, S.M. (eds.), in ULSI Technology, The McGraw-Hill Companies, Inc., Nyew York, Chapter 4, pp. 169-170 and 226-231 (1996).

Chen, G. et al., "Development of supported bifunctional electrocatalysts for unitized regenerative fuel cells," J. Electrochemical Society 149(8): A1092-A1099 (2002).
Choi, Y.B. et al., "Er-Al-codoped silicate planar light waveguide-type amplifier fabricated by radio-frequency sputtering," Optics Letters 25(4): 263-265 (2000).
Choy et al., "Eu-Doped Y2O3 Phosphor Films Produced by Electrostatic-Assisted Chemical Vapor Deposition," J. Mater. Res. 14(7): 3111-3114 (Jul. 1999).
Cocorullo, G. et al., "Amorphous silicon waveguides and light modulators for integrated photonics realized by low-temperature plasma-enhanced chemical-vapor deposition," Optics Lett. 21(24): 2002-2004 (1996).
Cooksey, K. et al., "Predicting permeability & Transmission rate for multilayer materials," Food Technology 53(9): 60-63 (1999).
Crowder, M.A. et al., "Low-temperature single-crystal Si TFT's fabricated on Si films processed via sequential lateral solidification," IEEE Electron Device Lett. 19(8): 306-308 (1998).
Delavaux, J-M. et al., "Integrated optics erbium ytterbium amplifier system in 10Gb/s fiber transmission experiment," $22^{nd}$ European Conference on Optical Communication, Osla, I.123-I.126 (1996).
Distributed Energy Resources: Fuel Cells, Projects, 4 pages http://www.eere.energy.gov/der/fuel_cells/projects.html (2003).
Dorey, R.A., "Low temperature micromoulding of functional ceramic devices," Grant summary for GR/S84156/01 for the UK Engineering and Physical Sciences Research Council, 2 pages (2004).
DuPont Teijin Films, Mylar 200 SBL 300, Product Information, 4 pages (2000).
Electrometals Technologies Limited, Financial Report for 2002, Corporate Directory, Chairman's review, Review of Operations, 10 pages (2002).
E-Tek website: FAQ, Inside E-Tek, E-TEk News, Products; http://www.etek-inc.com/, 10 pages (2003).
Flytzanis, C. et al., "Nonlinear optics in composite materials," in Progress in Optics XXIX, Elsevier Science Publishers B.V., pp. 323-425 (1991).
Frazao, O. et al., "EDFA gain flattening using long-period fibre gratings based on the electric arc technique," Proc. London Comm. Symp. 2001, London, England, 3 pages (2001).
Fujii, M. et al., "1.54 µm photoluminescence of $Er^{3+}$ doped into $SiO_2$ films containing Si nanocrystals: evidence for energy transfer from Si nanocrystals for $Er^{3+}$," Appl. Phys. Lett. 71(9): 1198-1200 (1997).
Garcia, C. et al., "Size dependence of lifetime and absorption cross section of Si nanocrystals embedded in $SiO_2$," Appl. Phys. Lett. 82(10): 1595-1597 (2003).
Goossens, A. et al., "Sensitization of $TiO_2$ with p-type semiconductor polymers," Chem. Phys. Lett. 287: 148 (1998).
Greene, J.E. et al., "Morphological and electrical properties of rf sputtered $Y_2O_3$-doped $ZrO_2$ thin films," J. Vac. Sci. Tech. 13(1): 72-75 (1976).
Han, H.-S. et al., "Optical gain at 1.54 µm in Erbium-doped Silicon nanocluster sensitized waveguide," Appl. Phys. Lett. 79(27): 4568-4570 (2001).
Hayakawa, T. et al., "Enhanced fluorescence from $Eu^{3+}$ owing to surface plasma oscillation of silver particles in glass," J. Non-Crystalline Solids 259: 16-22 (1999).
Hayakawa, T. et al., "Field enhancement effect of small Ag particles on the fluorescence from $Eu^{3+}$-doped $SiO_2$ glass," Appl. Phys. Lett. 74(11): 1513-1515 (1999).
Hayfield, P.C.S., I Development of a New Material-Monolithic $Ti_4O_7$ Ebonix® Ceramic, Royal Society of Chemistry, Cambridge, Table of Contents, 4 pages (2002).
Hehlen, M.P. et al., "Spectroscopic properties of $Er^{3+}$—and $Yb^{3+}$-doped soda-lime silicate and aluminosilicate glasses," Physical Review B 56(15): 9302-9318 (1997).
Hehlen, M.P. et al., "Uniform upconversion in high-concentration $Er^{3+}$-doped soda lime silicate and aluminosilicate glasses," Optics Letters 22(11); 772-774 (1997).
Horst, F. et al., "Compact, tunable optical devices in silicon-oxynitride waveguide technology," Top. Meeting Integrated Photonics Res. '00, Quebec, Canada, p. IThFl, 3 pages (2000).

Howson, R.P., "The reactive sputtering of oxides and nitrides," Pure & Appl. Chem. 66(6): 1311-1318 (1994).

Hubner, J. and Guldberg-Kjaer, S., "Planar Er- and Yb-doped amplifiers and lasers," COM Technical University of Denmark, 10$^{th}$ European Conf. on Integrated Optics, Session WeB2, pp. 71-74 (2001).

Hwang et al., "Characterization of sputter-deposited LiMn2O4 thin films for rechargeable microbatteries," 141(12) J. Electrochem. Soc. 3296-99 (1994).

Hwang, M-S. et al., "The effect of pulsed magnetron sputtering on the properties of iridium tin oxide thin films," Surface and Coatings Tech. 171: 29-33 (2003).

Im, J.S. and Sposili, R.S., "Crystalline Si films for integrated active-matrix liquid crystal displays," MRS Bulletin, pp. 39-48 (1996).

Im, J.S. et al., "Controlled super-lateral growth of Si-films for microstructural manipulation and optimization," Physica Status Solidi (A) 166(2): 603-617 (1998).

Im, J.S. et al., "Single-crystal Si films for thin-film transistor devices," Appl. Physics Lett. 70(25): 3434-3436 (1997).

Itoh, M. et al., "Large reduction of singlemode-fibre coupling loss in 1.5% Δ planar lightwave circuits using spot-size converters," Electronics Letters 38(2): 72-74 (2002).

Jackson, M.K. and Movassaghi, M., "An accurate compact EFA model," Eur. Conf. Optical Comm., Munich, Germany, 2 pages (2000).

Janssen, R. et al., "Photoinduced electron transfer from conjugated polymers onto nanocrystalline $TiO_2$," Synthet. Metal., 1 page (1999).

Johnson, J.E. et al., "Monolithically integrated semiconductor optical amplifier and electroabsorption modulator with dual-waveguide spot-size converter input," IEEE J. Selected topics in Quantum Electronics 6(1): 19-25 (2000).

Jonsson, L.B. et al., "Frequency response in pulsed DC reactive sputtering processes," Thin Solid Films 365: 43-48 (2000).

Kato, K. and Inoue, Y., "Recent progress on PLC hybrid integration," SPIE 3631: 28-36 (1999).

Kato, K. and Tohmori, Y., "PLC hybrid integration technology and its application to photonic components," IEEE J. Selected Topics in Quantum Electronics 6(1): 4-13 (2000).

Kelly, P.J. and Amen, R.D., "Control of the structure and properties of aluminum oxide coatings deposited by pulsed magnetron sputtering," J. Vac. Sci. Technol. A 17(3): 945-953 (1999).

Kelly, P.J. et al., "A novel technique for the deposition of aluminum-doped zinc oxide films," Thin Solid Films 426(1-2): 111-116 (2003).

Kelly, P.J. et al., "Reactive pulsed magnetron sputtering process for alumina films," J. Vac. Sci. Technol. A 18(6): 2890-2896 (2000).

Kik, P.G. and Polman, A., "Gain limiting processes in Er-doped Si nanocrystal waveguides in $SiO_2$," J. Appl. Phys. 91(1): 536-536 (2002).

Kim et al., "Correlation Between the Microstructures and the Cycling Performance of $RuO_2$ Electrodes for Thin-Film Microsupercapacitros," J. Vac. Sci. Technol. B20(5): 1827-1832 (Sep. 2002).

Kim, D-W. et al. "Mixture Behavior and Microwave Dielectric Properties in the Low-fired $TiO_2$-CuO System," Jpn. J. Appl. Phys. 39:2696-2700 (2000).

Kim, H-K. et al., "Characteristics of rapid-thermal-annealed LiCoO2 cathode film for an all-solid-state thin film microbattery," J. Vac. Sci. Technol. A 22(4): 1182-1187 (2004).

Kim, J-Y. et al. "Frequency-dependent pulsed direct current magnetron sputtering of titanium oxide films," J. Vac. Sci. Technol. A 19(2):429-434 (2001).

Ladouceur, F. and Love, J.D., in: Silica-based Buried Channel Waveguides and Devices, Chapman & Hall, London, Table of Contents, 6 pages (1996).

Ladouceur, F. et al., "Effect of side wall roughness in buried channel waveguides," IEEE Proc. Optoelectron. 141(4):242-248 (1994).

Lamb, W. and Zeiler, R., Designing Non-Foil Containing Skins for Vacuum Insulation Panel (VIP) Application, Vuoto XXVIII(1-2):55-58 (1999).

Lamb, W.B., "Designing Nonfoil Containing Skins for VIP Applications," DuPont VIA Symposium Presentation, 35 Pages (1999).

Lange, M.R. et al, "High Gain Ultra-Short Length Phosphate glass Erbium-Doped Fiber Amplifier Material," OSA Optical Fiber Communications (OFC), 3 Pages (2002).

Laporta, P. et al, "Diode-pumped cw bulk Er:Yb: glass laser," Optics Letters 16(24):1952-1954 (1991).

Laurent-Lund, C. et al., "PECVD Grown Multiple Core Planar Waveguides with Extremely Low Interface Reflections and Losses," IEEE Photonics Tech. Lett. 10(10):1431-1433 (1998).

Lee, B.H. et al., "Effects of interfacial layer growth on the electrical characteristics of thin titanium oxide films on silion," Appl. Phys. Lett. 74(21):3143-3145 (1999).

Lee, K.K. et al., "Effect of size and roughness on light transmission in a $Si/SiO_2$ waveguide: Experiments and model," Appl. Phys. Lett. 77(11):1617-1619 (2000).

Love, J.D. et al., "Quantifying Loss Minimisation in Single-Mode Fibre Tapers," Electronics Letters 22(17):912-914 (1986).

Mardare, D. and Rusu, G.I., "On the structure of Titanium Oxide Thin Films," Andalele Stiintifice Ale Universitatii IASI, Romania, pp. 201-208 (1999).

Marques, P.V.S. et al., "Planar Silica-on-Silicon Waveguide Lasers Based in Two Layers Core Devices," 10$^{th}$ European Conference on Integrated Optics, Session WeB2, pp. 79-82 (2001).

Meijerink, A. et al, "Luminescence of $Ag^+$ in Crystalline and Glassy $Srb_4O_7$," J. Physics Chem. Solids 54(8):901-906 (1993).

Mesnaoui, M. et al, "Spectroscopic properties of $Ag^+$ ions in phosphate glasses of $NaPO_3$- $AgPO_3$ system," Eur. J. Solid State Inorg. Chem. 29:1001-1013 (1992).

Mitomi, O. et al., "Design of a Single-Mode Tapered Waveguide for Low-Loss Chip-to-Fiber Coupling," IEEE J. Quantum Electronics 30(8): 1787-1793 (1994).

Mizuno, Y. et al "Temperature dependence of oxide decomposition on titanium surfaces in UHV," J. Vac. Sci & Tech. A. 20(5): 1716-1721 (2002).

Ohkubo, H. et al., Polarization-Insensitive Arrayed-Waveguide Grating Using Pure $SiO_2$ Cladding, Fifth Optoelectronics and Communication Conference (OECC 2000) Technical Digest, pp. 366-367 (2000).

Ohmi, S. et al., "Rare earth mental oxides for high-K fate insulator," VLSI Design 2004, 1 Page (2004).

Ohtsuki, T., et al., "Gain Characteristics of high concentration $Er^{3+}$-doped phosphate glass waveguide," J. Appl. Phys. 78(6):3617-3621 (1995).

Ono, H. et al., "Design of a Low-loss Y-branch Optical Waveguide," Fifth Optoelectronic and Communications Conference (OECC 2000) Technical Digest, pp. 502-503 (2000).

Padmini, P. et al. "Realization of High Tunability Barium Strontium Titanate Thin Films by rf Megnetron Sputtering," Appl. Phys. Lett. 75(20):3186-3188 (1999).

Pan, T. et al., Planar $Er^{3+}$-doped aluminosilicate waveguide amplifier with more than 10 dB gain across C-band, Optical Society of America, 3 pages (2000).

Park et al., "Characteristics of Pt Thin Film on the Conducting Ceramics TiO and Ebonex ($Ti_4 O_7$) as Electrode Materials," Thin Solid Films 258: 5-9 (1995).

Peters, D.P. et al., "Formation mechanism of silver nanocrystals made by ion irradiation of $Na^+$—$Ag^+$ ion-exchanged sodalime silicate glass," Nuclear Instruments and Methods in Physics Research B 168:237-244 (2000).

Rajarajan, M. et al., "Numerical Study of Spot-Size Expanders fro an Efficient OEIC to SMF Coupling," IEEE Photonics Technology Letters 10(8): 1082-1084 (1998).

Ramaswamy, R.V. et al., "Ion-Exchange Glass Waveguides: A Review," J. Lightwave Technology 6(6): 984-1002 (1988).

Roberts, S.W. et al., "The Photoluminescence of Erbium-doped Silicon Monoxide," University of Southampton, Department of Electronics and Computer Science Research Journal, 7 pages (1996).

Saha et al., "Large Reduction of Leakage Current by Graded-Layer La Doping in (Ba0.5,Sr0.5)TiO3 Thin Films," Appl. Phys. Lett. 79(1): 111-113 (Jul. 2001).

Sanyo Vacuum Industries Co., Ltd. Products Infor, $TiO_2$, (2003), 1 page, http://www.sanyovac.co.jp/Englishweb/products?ETiO2.htm.

Schermer, R. et al., "Investigation of Mesa Dielectric Waveguides," Proceedings of the OSA Integrated Photonics Research Topical Meeting and Exhibit, Paper No. IWB3, 3 pages (2001).

Schiller, S. et al., "PVD Coating of Plastic Webs and Sheets with High Rates on Large Areas," European Materials Research Society 1999 Spring Meeting, Jun. 1-4, 1999, Strasbourg, France, 13 pages (1999).
Scholl, R., "Power Supplies for Pulsed Plasma Technologies: State-of-the-Art and Outlook," Advances Energy Industries, Inc. 1-8 (1999).
Scholl, R., "Power Systems for Reactive Sputtering of Insulating Films," Advances Energy Industries, Inc., 1-8 (Aug. 2001).
Second International Symposium of Polymer Surface Modification: Relevance to Adhesion, Preliminary Program, 13 pages (1999).
Seventh International Conference on $TiO_2$ Photocatalysis: Fundamentals & Applications, Toronto, Ontario, Canada, Final Program, 7 pages (Nov. 17-21, 2002).
Sewell, P. et al., "Rib Waveguide Spot-Size Transformers: Modal Properties," J Lightwave Technology 17(5):848-856 (1999).
Shaw, D.G. et al., "Use of Vapor Deposited Acrylate Coatings to Improve the Barrier Properties of Metallized Film," Society of Vacuum Coaters, 37th Annual Technical Conference Proceedings, pp. 240-244 (1994).
Shin, J.C. et al. "Dielectric and Electrical Properties of Sputter Grown $(Ba,Se)TiO_3$ Thin Films," J. Appl. Phys. 86(1):506-513 (1999).
Shmulovich, J. et al., "Recent progress in Erbium-doped waveguide amplifiers," Bell Laboratories, pp. 35-37 (1999).
Slooff, L.H. et al., "Optical properties of Erbium-doped organic polydentate cage complexes," J. Appl. Phys. 83(1):497-503 (1998).
Smith, R.E. et al., "Reduced Coupling Loss Using a Tapered-Rib Adiabatic-Following Fiber Coupler," IEEE Photonics Technology Lett. 8(8):1052-1054 (1996).
Snoeks, E. et al., "Cooperative upconversion in erbium-implanted soda-lime silicate glass optical waveguides," J. Opt. Soc. Am. B 12(8): 1468-1474 (1995).
Strohhofer, C. and Polman, A. "Energy transfer to $Er^{3+}$ in Ag ion-exchanged glass," FOM Institute for Atomic and Molecular Physics, 10 pages (2001).
Sugiyama, A. et al., "Gas Permeation Through the Pinholes of Plastic Film Laminated with Aluminum Foil," Vuoto XXVIII(1-2):51-54 (1999).
Tervonen, A. "Challenges and opportunities for integrated optics in optical networks," SPIE 3620:2-11 (1999).
Ting, C.Y. et al., "Study of planarized sputter-deposited $SiO_2$," J. Vac. Sci Technol, 15(3):1105-1112 (1978).
Tomaszewski, H. et al., "Yttria-stabilized zirconia thin films grown by reactive r.f. magnetron sputtering," Thin Solid Films 287: 104-109 (1996).
Triechel, O. and Kirchhoff, V., "The influences of pulsed magnetron sputtering on topography and crystallinity of $TiO_2$ films on glass," Surface and Coating Technology 123:268-272 (2000).
Tukamoto, H. and West, A.R., "Electronic Conductivity of $LiCoO_s$ and Its Enhancement by Magnesium Doping," J. Electrochem. Soc 144(9):3164-3168 (1997).
Van Dover, R.B., "Amorphous Lanthanide-Doped $TiO_x$ Dielectric Films," Appl. Phys. Lett. 74(20):3041-3043 (1999).
Viljanen, J. and Leppihalme, M., "Planner Optical Coupling Elements for Multimode Fibers with Two-Step Ion Migration Process," Applied Physics 24(1):61-63 (1981).
Villegas, M.A. et al., "Optical spectroscopy of a soda lime glass exchanged with silver," Phys. Chem. Glasses 37(6):248-253 (1996).
Von Rottkay, K. et al., "Influences of stoichiometry on electrochromic cerium-titanium oxide compounds," Presented at the 11th Int'l Conference of Solid State Ionics, Honolulu, Hawaii, Nov. 19, 1997, Published in Solid State Ionics 113-115:425-430. (1998).
Westlinder, J. et al., "Simulations and Dielectric Characterization of Reactive dc Magnetron Cosputtered $(Ta_2O_5)_{1-x}(TiO_2)_x$ Thin Films," J Vac. Sci. Technol. B 20(3):855-861 (May/Jun. 2002).
Wilkes, K.E., "Gas Permeation Through Vacuum Barrier Films and its Effect on VIP Thermal Performance," presented at the Vacuum Insulation Panel Symp., Baltimore, Maryland, 21 pages (May 3, 1999).
Yanagawa, H. et al., "Index-and-Dimensional Taper and Its Application to Photonic Devices," J. Lightwave Technology 10(5):587-591 (1992).

Yoshikawa, K. et al., "Spray formed aluminum alloys for sputtering targets," Powder Metallurgy 43(3): 198-199 (2000).
Zhang, H. et al., "High Dielectric Strength, High k $TiO_2$ Films by Pulsed DC, Reactive Sputter Deposition," 5 pages (2001).
Bates et al. "Thin-Film Lithium Batteries" in New Trends in Electrochemical Technology: Energy Storage Systems for Electronics (T. Osaka & M. Datta eds. Gordon and Breach 2000).
Wang et al. 143 J. Electrochem. Soc. 3203-13 (1996).
Hwang et al., "Characterization of Sputter-Deposited $LiMn_2O_4$ Thin Films for Rechargeable Microbatteries," 141(12) J. Electrochem. Soc. 3296-99 (1994).
Jones et al., "A Thin Film Solid State Microbattery" 53-56 Solid State Ionics 628 (1992).
Mattox "Handbook of Physical Vapor Deposition (PVD) Processing, Society of Vacuum Coaters," Albuquerque, New Mexico 660f and 692ff, Noyes Publications (1998).
Sarro, P., "Silicon Carbide as a New MEMS Technology," Sensors and Actuators 82, 210-218 (2000).
Dobkin, D.M., "Silicon Dioxide: Properties and Applications".
Restriction Requirement dated Aug. 7, 2009, in U.S. Appl. No. 11/561,277.
Response to Restriction Requirement dated Dec. 4, 2009, in U.S. Appl. No. 11/561,277.
Non-Final Rejection dated Feb. 22, 2010, in U.S. Appl. No. 11/561,277.
Amendment/Response to Non-Final Rejection dated Jun. 22, 2010, in U.S. Appl. No. 11/561,277.
Final Rejection dated Aug. 20, 2010, in U.S. Appl. No. 11/561,277.
Amendment/Response to Final Office Action dated Oct. 20, 2010, in U.S. Appl. No. 11/561,277.
Advisory Action dated Nov. 16, 2010, in U.S. Appl. No. 11/561,277.
Non-Final Rejection dated Jun. 24, 2011, in U.S. Appl. No. 11/561,277.
Amendment/Response to Non-Final Office Action dated Oct. 24, 2011 in U.S. Appl. No. 11/561,277.
Inaguma, Yoshiyuki, "High Ionic Conductivity in Lithium Lanthanum Titanate," Solid State Communications,vol. 86, No. 10, pp. 689-693 (1993).
Guy, D., "Novel Architecture of Composite Electrode for Optimization of Lithium Battery Performance," Journal of Power Sources 157, pp. 438-442 (2006).
Wolfenstine, J., "Electrical Conductivity and Charge Compensation in Ta Doped $Li_4Ti_5O_{12}$," Journal of Power Sources 180, pp. 582-585 (2008).
Balanis, Constantine A., "Antenna Theory: Analysis and Design," 3rd Ed., pp. 811-820 (2005).
Hill, R. et al., "Large Area Deposition by Mid-Frequency AC Sputtering," Society of Vacuum Coaters, 41st Annual Tech. Cortfere Proceedings, 197-202 (1998).
Macák, Karol et al, "Ionized Sputter Deposition Using an Extremely High Plasma Density Pulsed Magnetron Discharge," J. Vac. Sci, Technol. A 18(4):1533-37 (2000).
Balanis, Constantine A., "Antenna Theory: Analysis and Design," 3rd Ed., pp. 817-820 (John Wiley & Sons, Inc. Publication, 2005).
Jones and Akridge, "A thin film solid state microbattery," Solid State Ionics 53-56 (1992), pp. 628-634.
Final Rejection dated Mar. 2, 2012, in U.S. Appl. No. 11/561,277.
Adachi et al., Thermal and Electrical Properties of Zirconium Nitride, 2005, Journal of Alloys and Compounds, 399, pp. 242-244.
Pichon et al., Zirconium Nitrides Deposited by Dual Ion Beam Sputtering: Physical Properties and Growth Modelling, 1999, Applied Surface Science, 150, pp. 115-124.
Tarniowy et al., The effect of thermal treatment on the structure, optical and electrical properties of amorphous titanium nitride thin films,Thin Solid Films, vol. 311, (1997), pp. 93-100.
Starner, "Human-powered wearable computing" 35 (3 & 4) IBM Sys. J. 618-29 (1996).
Laurikaitis et al. "Physical properties of zirconium oxynitride films deposited by reactive magnetron sputtering." Journal of Physics: Conference Series 100, 082051. (2008).

* cited by examiner

HYBRID THIN-FILM BATTERY

RELATED APPLICATIONS

The present application is a continuation-in-part, and claims the benefit under 35 U.S.C. §120, of U.S. patent application Ser. No. 11/561,277, entitled "Hybrid Thin-Film Battery," filed Nov. 17, 2006; which claims the benefit under 35 U.S.C. §119 of U.S. Patent Application Ser. No. 60/737,613, filed Nov. 17, 2005, U.S. Patent Application Ser. No. 60/759,479 filed Jan. 17, 2006, and U.S. Patent Application Ser. No. 60/782,792, filed Mar. 16, 2006; and is a continuation-in-part, and claims the benefit under 35 U.S.C. §120, of U.S. patent application Ser. No. 11/209,536, entitled "Electrochemical Apparatus with Barrier Layer Protected Substrate," filed Aug. 23, 2005, which is a continuation, and claims the benefit under 35 U.S.C. §120, of U.S. patent application Ser. No. 11/374,282, converted from U.S. provisional application Ser. No. 60/690,697 and filed on Jun. 15, 2005, entitled "Electrochemical Apparatus with Barrier Layer Protected Substrate," which is a continuation-in-part, and claims the benefit under 35 U.S.C. §120, of U.S. patent application Ser. No. 10/215,190, filed 9 Aug. 2002, entitled "Methods of and device for encapsulation and termination of electronic devices," now U.S. Pat. No. 6,916,679, issued Jul. 12, 2005, which are all incorporated herein by reference in their entirety.

FIELD OF THE INVENTION

The field of this invention relates to electrochemical devices and methods of manufacturing thereof, and more particularly, the composition, method of depositing, and fabrication of solid-state, thin-film, secondary and primary electrochemical devices, including batteries.

BACKGROUND

Thick positive cathodes are good for creating energy-rich thin-film batteries. A thick positive cathode substantially increases the active cathode mass per unit area. Unfortunately, producing such cathodes with typical vacuum vapor phase processes has been problematic.

Cathodes made with a typical vacuum vapor phase method have a number of limitations. For instance, vacuum vapor phase deposited materials typically grow in columns as schematically shown in FIG. 1. This figure depicts schematically and in cross-sectional view three microscopic columns, grown by a vacuum vapor phase deposition method, of the positive cathode layer of an electrochemical device. As the columns grow through the process, the bases of these columns remain anchored to the substrate surface and the cross sectional area of these bases remains virtually fixed as the height of the columns grows. As the height of the columns increases, the aspect ratio (height of column/width of column) increases and the cathode film consisting of these columns and thus the entire device becomes mechanically unstable, typically around an aspect ratio of 15. Thus, there are limitations to the height, and therefore the thickness, of columns grown with a vacuum deposition processes. Limitations on the height directly correspond to the thickness of the cathode and the energy of an electrochemical device per unit area that can be produced using a vacuum vapor phase deposition method. Furthermore, thick cathodes take a relatively long time to grow using a vacuum vapor phase process and are, therefore, quite expensive. For instance, $LiCoO_2$ positive cathodes grown in a vacuum vapor phase deposition method above about 3 μm become overly expensive because of their long deposition time.

Thus, there is demand for electrochemical devices whose cathodes can be produced thick and reliably while being fabricated quickly and inexpensively. Further, it would be desirable to accomplish these demands using any of the many well-known non-vapor phase deposition techniques and processes, such as slurry coating, Meyer rod coating, direct and reverse roll coating, doctor blade coating, spin coating, electrophoretic deposition, sol-gel deposition, spray coating, dip coating, and ink-jetting, to name a few.

Depositing a thicker cathode in order to increase the energy of an electrochemical device per unit area results in an increased, overall thickness of the device. Because an overall thickness increase of a milli, micro, or nano device is typically undesirable, the device manufacturer has to explore options of how to compensate for or offset such a thickness increase. A generally valid and desirable approach is to minimize the thickness and volume of all of the non-energy providing components inside an electrochemical device.

One of the options is to reduce the non-energy providing packaging of an electrochemical device. Both the encapsulation and the substrate are inherent and usually large, fractional parts of the packaging.

For instance, the reduction of an encapsulation thickness from 100 micrometers, which is a typical thickness for a laminate encapsulation, to a true thin-film encapsulation in the range of 1-10 micrometers would allow the electrochemical device manufacturer, for example, to increase the thickness of the energy bearing cathode by almost 100 micrometers without any discernible overall thickness change of the device. This design approach substantially improves the volumetric quantities of energy, capacity, and power of the electrochemical device. Because these physical performance quantities are required to be delivered in the smallest volume possible for most any milli, micro, or nano electrochemical device, the reduction of the non-energy providing components inside an electrochemical device is critically important for its acceptance in the marketplace.

The other option is to fabricate an electrochemical device onto the thinnest possible substrate, if used, traded or sold as a standalone device. This is different from the non-standalone case wherein the device manufacturer may exploit an existing, free surface in an electronic device (chip surface, printed circuit board surface, etc.) and then directly integrate, fabricate or deposit the electrochemical device onto that free surface. This surface then serves as the electrochemical device's substrate as well. One may consider such an electrochemical device being configured with a zero-thickness substrate because no further substrate thickness was introduced by the electrochemical device into the final electronic device. In the more common, standalone case, however, the limits of substrate thinness are reached when it does not provide adequate chemical and physical, mainly mechanical, protection or functionality anymore to support the electrochemical device. Because most vacuum deposited cathode materials require high-temperature processing to fully develop all of their physical properties, which in turn creates film stresses that are translated into the substrate, the mechanical properties of these vacuum vapor deposited cathode materials may challenge any substrate in terms of mechanical deformation.

The typical result of vacuum vapor phase deposited films in conjunction with high-temperature processing is a bending, warping, or general deformation of the substrate and thus the entire electrochemical device. If this situation occurs, then completing the fabrication of the electrochemical device becomes difficult, in addition to the mere fact that a deformed electrochemical device is not well suited for device integration. In contrast, non-vapor phase deposited cathode materials may be fabricated with most or even all of their important physical properties already developed at the time of deposition, so that any high-temperature processing becomes redundant. Hence, non-vapor phase deposited cathode materials and other components of an electrochemical device create less stress in the substrate and allow the use of a thinner substrate without the risk of substantially deforming it.

Accordingly, there is also a need for capsulation that exhibits fairly high-temperature characteristics.

Thus, there is demand for an electrochemical device (i) whose cathode can be produced thick and reliably while being fabricated quickly and inexpensively, (ii) whose substrate thickness is as thin as possible while not being deformed by the component layers of the electrochemical device, (iii) whose encapsulation is fabricated as thin as possible while still providing adequate protection against the ambient in which these devices are operated, and/or (iv) whose encapsulation is composed of high-temperature materials that provide the entire electrochemical device with increased thermal resilience.

SUMMARY

Various aspects and embodiments of the present invention, as described in more detail and by example below, address certain of the shortfalls of the background technology and emerging needs in the relevant industries.

One aspect of the invention is an electrochemical device comprising a positive cathode greater than about 0.5 μm and less than about 200 μm thick; a thin electrolyte less than about 10 μm thick; and an anode less than about 30 μm thick. The device may also comprise a substrate, current collectors, terminals, a moisture protection layer, and an encapsulation. In an embodiment of the invention, the cathode may be greater than about 5 μm and less than about 100 μm thick. The cathode may also be greater than about 30 μm and less than about 80 μm thick.

Another aspect of the invention is an electrochemical device comprising a non-vapor phase deposited cathode, an anode, and an electrolyte that is less than 10 μm thick. In an embodiment of the invention, the cathode may be greater than about 0.5 μm and less than about 200 μm thick, and the anode may be less than about 30 μm thick Another aspect of an embodiment of the invention includes, for example, a non-vapor deposited cathode that may be rechargeable (secondary) or non-rechargeable (primary). The feasibility of a non-vacuum deposition technique is independent of the electrochemical properties or capabilities of the cathode material, and thus is independent of the actual cathode material. Each cathode material may be fabricated with its own formula and set of optimized fabrication parameters, including the recipe for the carbonaceous electronic conduction enhancers and polymeric binders.

$CF_x$ is an exemplary non-rechargeable cathode material for non-rechargeable (primary) Li batteries that contain a metal Li anode. The exemplary use of $CF_x$ or non-rechargeable Li batteries in conjunction with an inorganic thin-film electrolyte such as Lipon is one unique aspect of an embodiment of this invention.

Non-rechargeable cathodes may, for example, exhibit a larger capacity density and energy density compared to rechargeable cathodes, including a rechargeable cathode of $LiCoO_2$, for example. On a gravimetric basis, $LiCoO_2$ may deliver, for example, about 140 mAh/g of capacity while $CF_x$, where x falls in the range from 0 to 4, for example, may provide capacity in the 600 mAh/g range. In terms of volumetric capacity, $LiCoO_2$ may supply, for example, 708 mAh/cm in comparison to $CF_x$, which may supply, for example, approximately 1320 mAh/cm³. Considering examples of a Li/$LiCoO_2$ used in a 4V battery system and Li/$CF_x$ used in a 3V battery system, the volumetric energy densities may be 2.83 Wh/cm³ and 3.96 Wh/cm³, respectively. Thus, for the same amount of active cathode volume, the Li/$CF_x$ battery can deliver about 40% more volumetric energy in one discharge duty cycle. In today's wireless world, this added energy may, for example, be attractive to a number of consumer and military applications as well as several emerging potential applications (smart cards, RFID tags, etc.).

However, as may be typical for certain non-rechargeable cathodes, once $CF_x$ has delivered its entire capacity, the entire battery may have to be discarded. For applications that for any reason, such as cost or space, for example, cannot be configured with an electronic rechargeability method (such as available grid power, an electronic mother board in an electronically powered device that is connected to a main power source, or ambient energy harvesting by solar/kinetic/inductive/RF energy, for example), the $CF_x$ cathode can in certain embodiments provide an extended energy supply.

Also, in certain exemplary applications that for any reason, such as cost or space, for example, cannot be configured with an electronic rechargeability method, the $CF_x$ cathode may provide an extended energy supply and thus may be a more attractive solution than a battery with a rechargeable cathode, such as $LiCoO_2$, for example.

A cathode in accordance with an aspect of an embodiment of the invention may be non-vapor phase deposited. The cathode may be deposited by one of the following methods: slurry coating, Meyer rod coating, direct and reverse roll coating, doctor blade coating, spin coating, electrophoretic deposition or ink-jetting.

The cathode may comprise $LiCoO_2$, $LiMn_2O_4$, $LiMnO_2$, $LiNiO_2$, $LiFePO_4$, $LiVO_2$, and any mixture or chemical derivative thereof. Alternatively these cathode materials may be doped with elements from the groups 1 through 17 of the periodic table.

The cathode may also, for example, comprise $CF_x$ (carbon fluoride) material, wherein x falls in the range from 0 to 4, for example, in order to deliver greater volumetric energy per discharge duty cycle.

In an embodiment of the invention, an electrochemical device may comprise a non-vacuum fabricated $LiCoO_2$ cathode, for example, or other cathode material in conjunction with typical vacuum fabricated battery layers, such as RF magnetron sputter deposited Lipon electrolyte, resistively evaporated metallic Lithium anode, and other auxiliary battery layers that are fabricated by PVD or CVD methods, for example. The non-vacuum fabricated cathode may or may not be deposited as a composite together with carbonaceous electronic conduction enhancers and polymeric binders (PVDF, Teflon, etc.).

Compared to vacuum deposited cathodes, such as, for example, those that are deposited by RF magnetron sputtering, the non-vacuum deposited cathode (composite or not), may be deposited much faster (seconds to minutes versus hours of the RF magnetron sputter deposited material), much less expensive (capital expenditures for similar cathode layer throughput machines is about 10% of that of a vacuum chamber), and films can be deposited much thicker with much more capacity (up to 4 times) than can be accomplished with any vacuum deposition method.

In an embodiment, the electrolyte may comprise lithium phosphorus oxynitride (LiPON). The electrolyte may comprise a thin-film electrolyte. The electrolyte may be deposited by a vacuum vapor phase growth method- or non-vapor phase method.

The anode may comprise lithium, a lithium alloy or a metal, which can form a solid solution or a chemical compound with lithium, or a so-called lithium-ion compound suitable for use as a negative anode material in lithium based batteries, such as, for example, $Li_4Ti_5O_{12}$.

In a further aspect of an embodiment of the invention, an electrochemical device may also be encapsulated with an encapsulation process selected from the group consisting of vacuum vapor phase grown thin-film encapsulation, pressure-heat lamination as described by Snyder et al. in U.S. Pat. No. 6,916,679, the contents of which are hereby incorporated herein by reference in its entirety, metal foil attachment, and metal canning.

The device may further comprise a cathode current collector and an optional anode current collector on top or underneath of the thin electrolyte layer. The electrolyte immediately underneath the optional anode current collector may be protected by a moisture barrier, such as $ZrO_2$, if the encapsulation has an opening that allows the optional anode current collector to be in direct contact with ambient atmosphere.

According to an aspect of an embodiment of the present invention, non-vapor phase fabrication methods may be used to form a positive cathode, and the cathode combined with cell components of an electrochemical device that are all, or in part fabricated by vacuum vapor phase methods. Exemplary embodiments that utilize such a combination of different methods are viewed as hybrid fabrication methods and resulting devices, for example, a "hybrid thin-film battery."

In another aspect of an embodiment of the invention, the non-vapor phase fabrication of the positive cathode does not require a high-temperature fabrication step, which limits the stress development inside the component layer stack of an electrochemical device. This in turn allows use of a thinner substrate. Although thinner substrates may be prone to undesirable deformation under a given magnitude of stress, tradeoffs from using a thin substrate include a thinner electrochemical device for a given energy, capacity, and power performance. In other words, the use of a thinner substrate allows for increases in the volumetric quantities of energy, capacity, and power of an electrochemical device.

In another aspect, the cathode may be vacuum vapor phase grown, or fabricated by a non-vapor phase method, and then may be mechanically embossed or otherwise formed into structures that increase its surface area within the same previously coated footprint, but with resulting increased maximum thickness and decreased minimum thickness. This structure or architecture minimizes the average distance of any volume element inside the cathode relative to the neighboring solid state thin-film electrolyte layer, which, unlike in electrochemical devices with gel or liquid type electrolytes, typically does not intimately penetrate the cathode bulk. Therefore, minimizing the average distance of any volume element inside the cathode relative to the solid state thin-film electrolyte reduces the ionic diffusion lengths during operation of the electrochemical device, which in turn improves its power capability.

A further aspect of an embodiment of the invention involves mixing electronic conducting material such as carbon into an embossed or other surface-increased cathode structure to minimize electronic diffusion lengths inside the cathode bulk to improve the power capability of an electrochemical device.

In another aspect of an embodiment of the invention, an electrochemical device includes a thin-film encapsulation comprising or consisting of inorganic material that exhibits fairly good high-temperature characteristics.

In another aspect of an embodiment of the invention, a thin-film encapsulation is used to minimize the thickness contribution of the encapsulation to the overall thickness of the electrochemical device.

In another aspect, a thin encapsulation, such as a thin-film encapsulation, can overcompensate or at least compensate in full, or in part for any thickness increase of the cathode relative to the overall thickness of the electrochemical device. In addition, and compared with, for example, a pressure-heat laminate, the use of a thinner encapsulation directly increases the volumetric quantities of energy, capacity, and power of a given electrochemical device.

In yet another aspect of an embodiment of the invention, a thin-film encapsulation consists of multiple inorganic layers that all exhibit intrinsic, high-temperature stability, a characteristic that raises to some extent the temperature stability and resilience of the entire electrochemical device.

BRIEF DESCRIPTION OF THE FIGURES

The accompanying drawings, which are included to provide a further understanding of the invention and are incorporated in and constitute a part of this specification, illustrate exemplary embodiments of the invention that together with the description serve to explain the principles of the invention. In the drawings.

DETAILED DESCRIPTION

Figure 1:
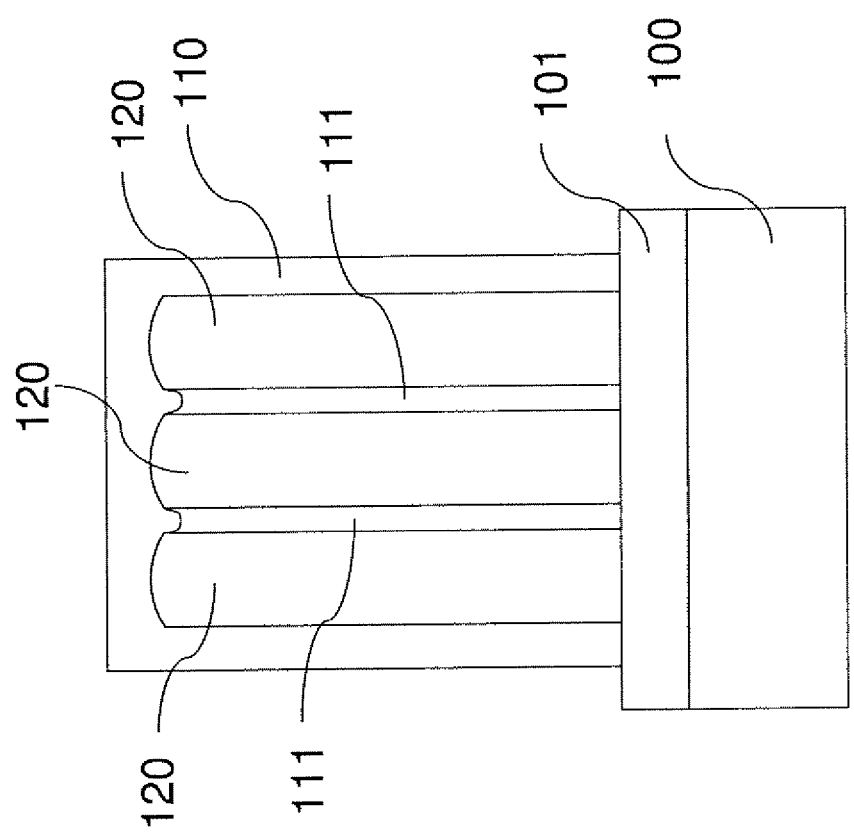
FIG. 1 schematically shows a cathode with columns grown according to methods used in the prior art.

FIG. 1 illustrates a schematic cross-sectional view of a typical cathode layer 120 fabricated onto a metal current collector 101 over a substrate 100. In electrochemical devices produced by vacuum vapor phase deposition processes, the cathode may grow, for example, in columns 120 with inter-columnar void space 111. Also shown in FIG. 1 is a next layer in the fabrication process sequence of the thin-film electrochemical device, the electrolyte 110 with a typical bridging structure over the inter-columnar void space 111.

Figure 2:
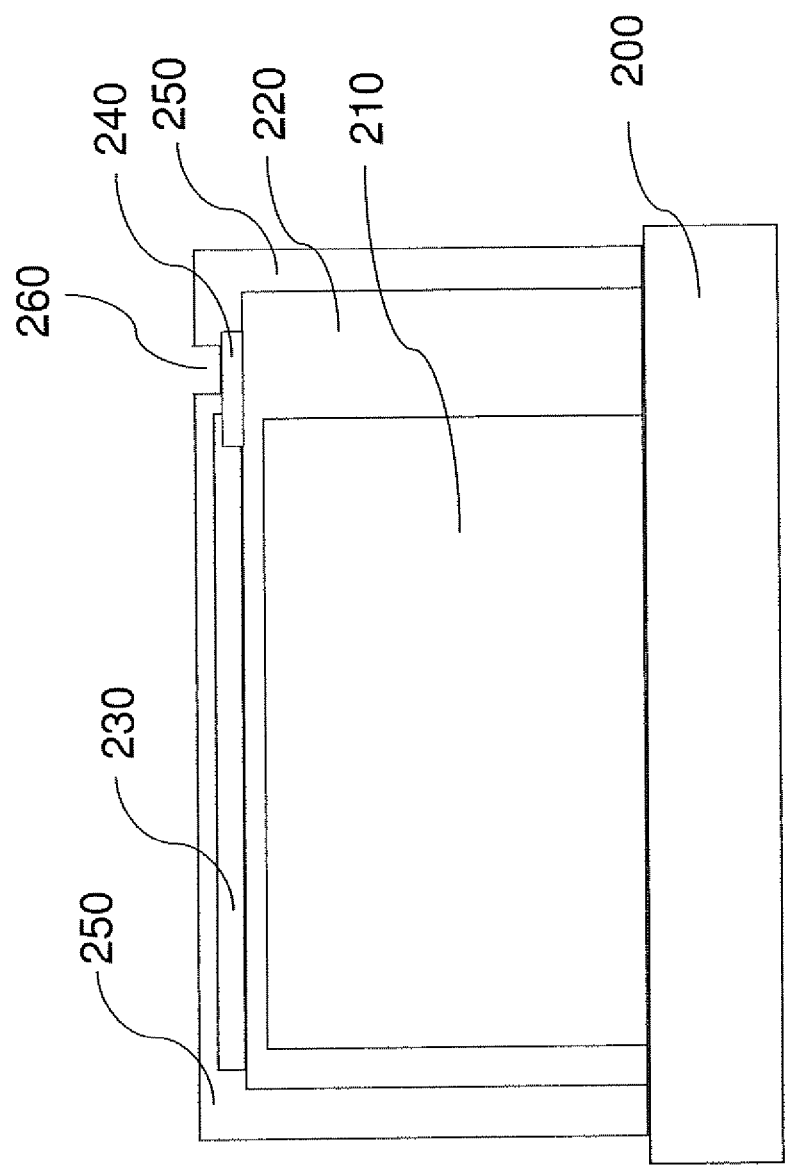
FIG. 2 illustrates a hybrid thin-film electrochemical device according to an exemplary embodiment of the present invention.

FIG. 2 shows a hybrid thin-film electrochemical device with a cathode 210 deposited without using a vacuum vapor phase process according to an exemplary embodiment of the present invention. Exemplary non-vacuum deposited cathode may be rechargeable or non-rechargeable. In this embodiment, a cathode 210 is directly deposited onto a substrate 200. If metallically conducting, for example, the substrate 200 in this embodiment may also serve as the cathode current collector. Otherwise, a metallically conducting current collector (not shown) may be interposed between the substrate 200 and the cathode 210. The cathode 210, for example, may, for example, comprise $LiCoO_2$, $LiMn_2O_4$, $LiMnO_2$, $LiNiO_2$, $LiFePO_4$, $LiVO_2$, or any mixture or chemical derivative thereof. The cathode 210, for example, may comprise $CF_x$ (carbon fluoride) material, wherein x may, for example, fall within the range of 0 to 4. The cathode 210, for example, in one embodiment, may be between about 0.5 µm and about 200 µm thick. In a preferred embodiment, the cathode 210, may, for example, be between about 5 and about 100 µm thick. In a most preferred embodiment, for example, the cathode 210 may be between about 30 to about 80 µm thick.

As shown in FIG. 2, an electrolyte layer 220 may be deposited on the top surface of the cathode layer 210. The electrolyte layer may, for example, comprise lithium phosphorus oxynitride (LiPON) or other solid state thin-film electrolytes such as $LiAlF_4$, as discussed in U.S. Pat. No. 4,367,267, or $Li_3PO_4$ doped $Li_4SiS_4$, as discussed by Yamamura et al. in U.S. Pat. No. 5,217,826. Both of these patents are incorporated herein in their entirety by reference. This electrolyte layer 220 may, for example, be less then about 10 µm thick.

The cathode 210 is thick when compared to the relative sizes of the electrolyte 220, substrate 200, and an anode 230 formed over the electrolyte 220. In other embodiments, the relative size of the cathode 210 is also thick in comparison to the anode current collector 240, as well as a thin-film encapsulation 250.

The electrolyte 220 may be deposited on the cathode 210 using a variety of methods. These methods may include, for example, vacuum vapor phase growth methods or non-vapor phase methods. Vacuum vapor phase methods may include, for example, reactive or non-reactive RF magnetron sputtering, reactive or non-reactive DC diode sputtering, reactive or non-reactive thermal (resistive) evaporation, reactive or non-reactive electron beam evaporation, ion-beam assisted deposition, plasma enhanced chemical vapor deposition or the like. Non-vapor phase methods may include, for example, spin coating, ink-jetting, thermal spray deposition or dip coating. Spin coating is discussed, for example, by Stetter et al. in U.S. Pat. No. 4,795,543; Venkatasetty in U.S. Pat. No. 4,948,490; or Schmidt et al. in U.S. Pat. No. 6,005,705. One such ink-jetting process is disclosed by Delnick in U.S. Pat. No. 5,865,860. A thermal spray deposition process is disclosed by Inda in U.S. Patent Publication No. 2004/0106046. Dip coating is discussed by Kejha in U.S. Pat. No. 5,443,602 and U.S. Pat. No. 6,134,773. Each of the above patents and patent publications is incorporated herein by reference in its entirety.

As shown in FIG. 2, the next layer on top of the electrolyte is the thin negative anode layer 230. The thin anode 230 may comprise, for example, lithium, lithium alloys, metals that can form solid solutions or chemical compounds with lithium, or a so-called lithium-ion compound that may be used as a negative anode material in lithium based batteries, such as, for example, $Li_4Ti_5O_{12}$. The thin anode layer 230, for example, may be less than about 30 µm thick. The thin anode may make contact with the anode current collector 240, which can be accessed electrically through an opening 260 in the encapsulation 250. In one embodiment the anode current collector is less than about 2 µm thick. The thin-film encapsulation 250, for example, may be electrically conducting in certain areas and thus may, in some embodiments, serve as an anode current collector. In such embodiments, a separately deposited anode current collector 240 would not be necessary. The thin-film encapsulation 250 may, for example, be less than about 250 µm thick.

The cathode 210 in FIG. 2 may be deposited on the substrate 200 using a variety of deposition methods. In one specific embodiment, the cathode material 210 is deposited using a non-vapor phase deposition method. Non-vapor phase deposition methods are not performed in a vacuum environment. A number of non-vapor phase deposition methods are known in the art. A few exemplary methods include, slurry coating, Meyer rod coating, direct and reverse roll coating, doctor blade coating, spin coating, electrophoretic deposition, sol-gel deposition, spray coating, dip coating, and ink-jetting, to name a few. Any other non-vapor phase deposition methods or methods that do not require deposition in a vacuum may be used without deviating from the spirit, scope or embodiments of the present invention. These non-vapor phase, non-vacuum deposition methods may produce a single phase cathode or a composite cathode. The composite cathode may be deposited either on a nanoscopic, microscopic, or milliscopic scale and may consist of organic and/or inorganic matter which, in addition, may be polymerized, such as poly (vinyl pyrrolidone), sulfur nitride $(SN)_x$, nano-tubed carbon or acetylene black. A non-vacuum deposited cathode may be rechargeable or non-rechargeable.

All of the depositions mentioned herein, may, for example, be followed by a drying step with temperatures below about 150° C., and/or a low-temperature drying and adhesion improving step with temperatures between about 150° C. to about 400° C., and/or a high temperature anneal step ranging from about 400° C. to about 1000° C. These steps may help, for example, in drying, improving adhesion, formation of the correct film phase, and/or crystallization. The cathode deposition material may be used either in pure form or mixed with binder material, with or without carbon-type, metal-type or alloy-type electrical conduction enhancers. When the cathode material comprises a mixed form rather than a pure form, such cathode materials may be composite cathode materials.

The method of slurry coating has been used in battery fabrication as shown, for example, by Hikaru et al. in U.S. Pat.

No. 6,114,062, or by Kinsman in U.S. Pat. No. 4,125,686, which are incorporated herein in the entirety by reference. Slurry coating may lead to the deposition of a composite electrode consisting of the electrochemical active material, which is in the form of finely dispersed powder particles that are bonded together using a polymeric binder and some form of electrical conduction enhancer, such as carbon black or the like. Also, the slurry contains solvents which need to be evaporated and/or pyrolyzed after film deposition.

According to an exemplary embodiment, a composite cathode may be deposited from slurry including or consisting of fully crystalline $LiCoO_2$ powder, a polyimide binder, and a graphite electrical conduction enhancer. This slurry may then be coated onto an Al foil substrate and dried at temperatures below about 150° C. in ambient air for less than about 2 days. Subsequently, in this embodiment, the cathode may be coated, for example, with an about 2 µm LiPON thin-film electrolyte, an about 3 µm thick Li negative anode, and an about 0.3 µm thick Cu anode current collector. Finally, an about 100 µm thick heat and pressure sensitive metal-polymer laminate, which may serve to encapsulate the electrochemical device, may be applied to the electrochemical device so that the electrochemical performance of the device may be tested in the ambient.

In an exemplary another embodiment, the dried slurry coating may require an additional drying, adhesion, formation, and/or crystallization steps at temperatures up to about 1000° C., as described above, to finalize the structure of the cathode or composite cathode. This method is quick, simple and can produce thick cathodes without using a vacuum vapor phase method. Furthermore, the resulting cathode does not have the mechanical instability as those produced by vacuum vapor phase deposition methods.

Figure 14:
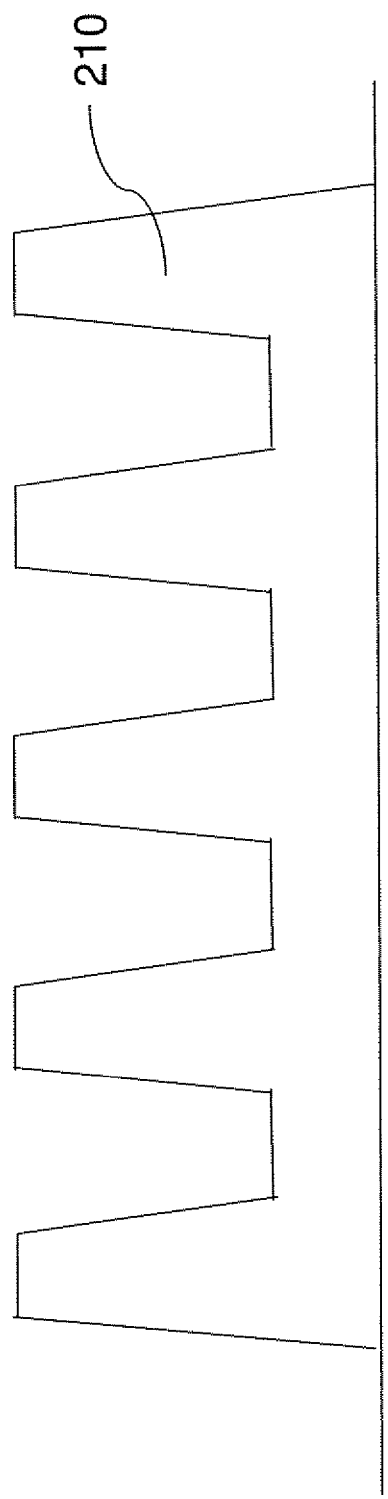
FIG. 14 shows an exemplary embodiment of an embossed cathode layer.

The cathode 210 in FIG. 2 may be modified as shown, for example, in FIG. 14 through mechanical displacement or removal means including embossing, stamping, abrading, scraping, forming and the like. This layer modification may be performed on either the wet or completely dried cathode. This cathode surface modification improves the ion transfer efficiency between the cathode bulk and the thin-film electrolyte, for example, consisting of a LiPON layer (not shown), and thus improves the power performance of the electrochemical device.

Further improvement in power capability may be accomplished when cathode 210 comprises a composite material including or consisting of at least the electrochemically active cathode material, for example $LiCoO_2$, and a carbonaceous electronic conduction enhancer, which serves to minimize the electronic diffusion lengths inside the composite cathode bulk.

Figure 3:
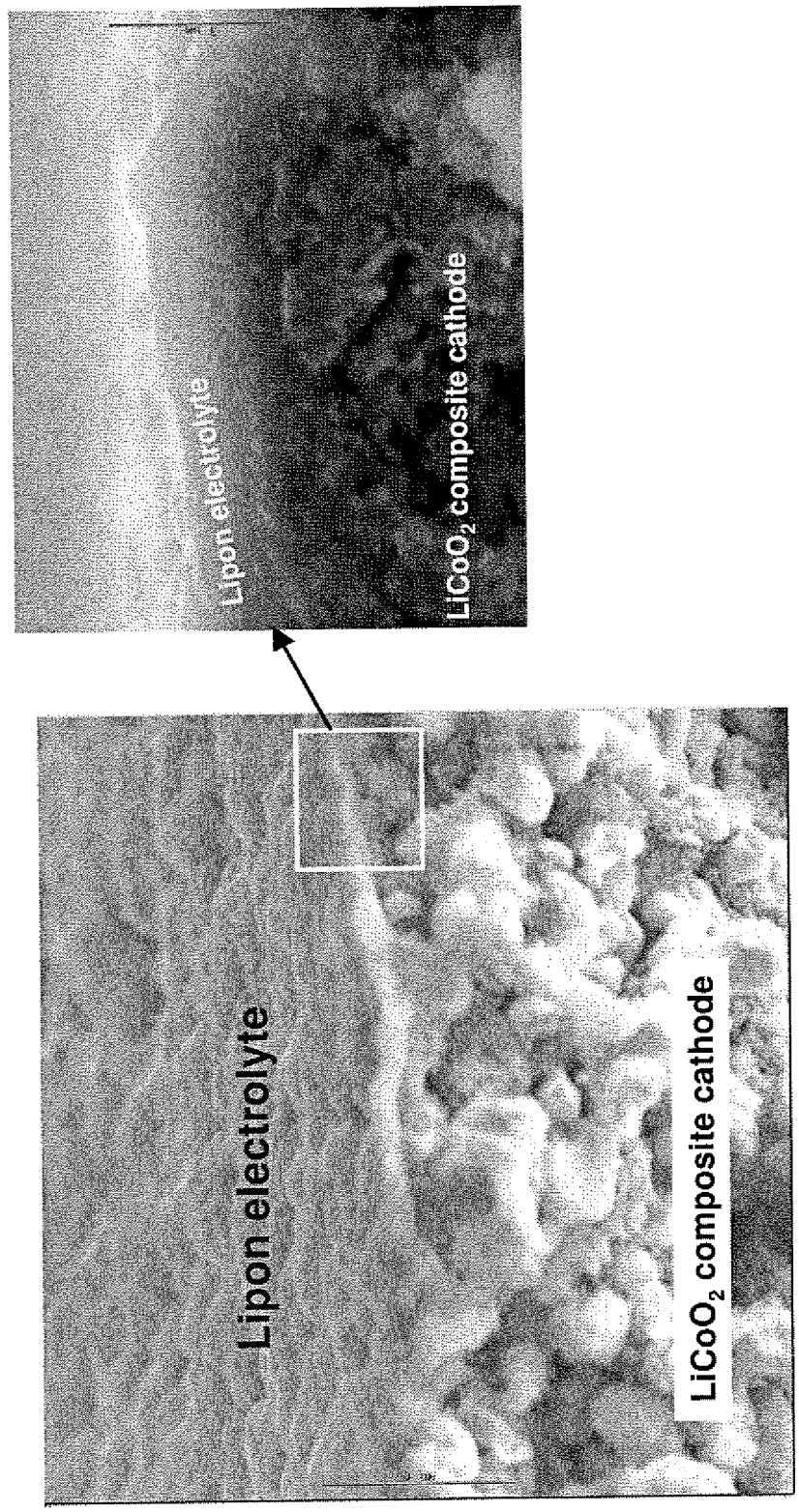
FIG. 3 shows a cross-sectional view of a scanning electron micrograph of a composite $LiCoO_2$ cathode deposited by slurry coating and then coated with a LiPON thin-film electrolyte according to an exemplary embodiment of the invention.

FIG. 3 shows a cross-sectional view of a scanning electron micrograph showing an exemplary LiPON coated composite cathode. The dimension calibration bar at the very left side in the left picture is about 9 µm long; and the one in the insert picture on the right side represents a length of about 3 µm.

Figure 4:
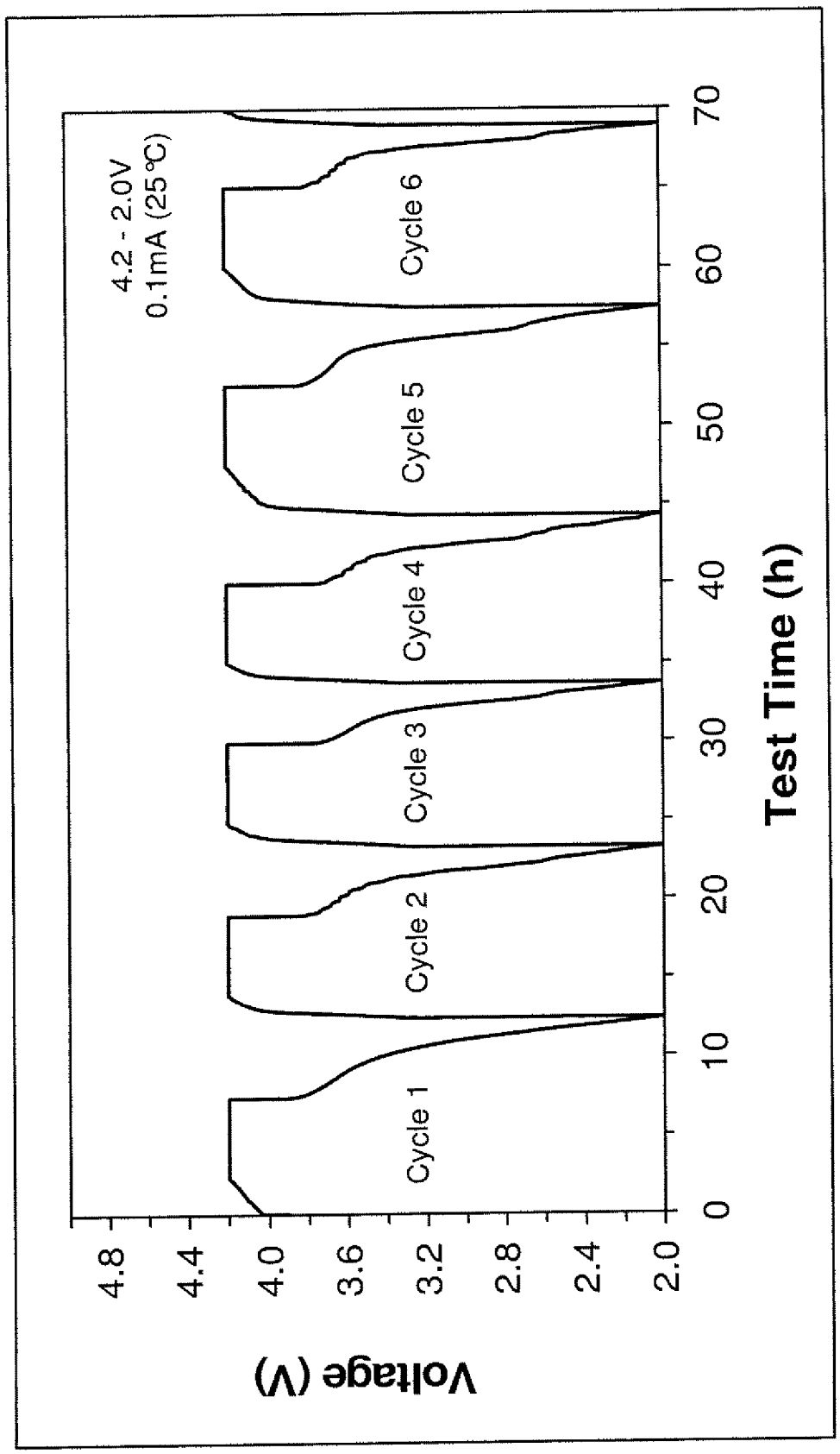
FIG. 4 illustrates the electrochemical cycle behavior of an electrochemical device using the composite $LiCoO_2$ cathode and the LiPON thin-film from FIG. 3 according to an exemplary embodiment of the invention.

An electrochemical cycling performance of an electrochemical device according to an exemplary embodiment of the present invention is shown in FIG. 4.

According to an exemplary embodiment of the invention, a composite cathode may be deposited by Meyer rod coating of a viscous suspension or solution containing, for example, $LiCoO_2$ powder, as described by Principe et al. in U.S. Pat. No. 6,079,352, which is incorporated herein by reference in its entirety. Alternatively, a polymeric binder, such as, for example, a polyimide, and/or an electrical conduction enhancer, such as graphite, may be admixed. This coating on a substrate, such as an Al foil substrate, may then be dried at temperatures below, for example, about 150° C. in air for less than about 2 days. Subsequently, in this embodiment the cathode may be coated, for example, with an about 2 µm LiPON thin-film electrolyte, an about 3 µm thick Li negative anode, and an about 0.3 µm thick Cu anode current collector. Finally, an about 100 µm thick heat and pressure sensitive metal-polymer laminate, which may serve to encapsulate the electrochemical device, may be applied to the electrochemical device so that the electrochemical performance of the device may be tested in the ambient.

In an exemplary embodiment, a dried Meyer rod coating may require an additional drying, adhesion, formation, and/or crystallization steps at temperatures up to, for example, about 1000° C., as described above, to finalize the structure of the cathode or composite cathode. This method is quick, simple and can produce thick cathodes without using a vacuum vapor phase method. Furthermore, the resulting cathode does not have the mechanical instability as those produced by vacuum vapor phase deposition methods.

According to an exemplary embodiment of the invention, a composite cathode may be deposited by direct and/or reverse roll coating of a viscous suspension or solution, containing, for example, $LiCoO_2$ powder as described by Davis et al. in U.S. Pat. No. 3,535,295, which is incorporated herein by reference in its entirety. Alternatively, a polymeric binder, such as, for example, a polyimide, and/or an electrical conduction enhancer, such as graphite, may be admixed. This coating onto a substrate, such as an Al foil substrate, may then be dried at temperatures below about 150° C. in ambient air for less than about 2 days. Subsequently, in this embodiment, the cathode may be coated, for example, with an about 2 µm LiPON thin-film electrolyte, an about 3 µm thick Li negative anode, and an about 0.3 µm thick Cu anode current collector. Finally, an about 100 µm thick heat and pressure sensitive metal-polymer laminate, which may serve to encapsulate the electrochemical device, may be applied to the electrochemical device so that the electrochemical performance of the device may be tested in the ambient.

In an exemplary embodiment, a dried direct or reverse roll coated deposit may require an additional drying, adhesion, formation, and/or crystallization steps at temperatures up to, for example, about 1000° C., as described above, to finalize the structure of the cathode or composite cathode. This method is quick, simple and can produce thick cathodes without using a vacuum vapor phase method. Furthermore, the resulting cathode does not have the mechanical instability as those produced by vacuum vapor phase deposition methods.

According to an exemplary embodiment of the invention, a thick cathode may be deposited on a substrate via a doctor blade technique as disclosed by Brown in GB Patent No. 947518, which is incorporated herein in its entirety by reference. This deposition method is analogous to spreading butter. Accordingly, for example, a fine blade slices into some cathode material paste, consisting of the electrochemically active material, in precursor or final form, mixed with solvents, binders, and potentially electrical conduction enhancer materials, and then spreads the cathode material paste under a certain thickness directly onto a substrate. Depending on the formulation of the cathode material paste, additional drying, adhesion, formation and/or crystallization steps at temperatures of up to about 1000° C., as described above, may be used to form the final cathode or composite cathode. This method is quick, simple and can produce thick cathodes without using a vacuum vapor phase method. Furthermore, the resulting cathode does not have the mechanical instability as those produced by vacuum vapor phase deposition methods.

Spin coating is used in the thin-film coating industry, using a variety of standard spin coaters offered by many well-known manufacturers, such as Hitachi disclosed in JP Patent No. 1320728 and incorporated herein by reference in its entirety. Using a spin coating technique, a cathode powder is suspended or dispersed in a solvent of a low boiling point (high volatility), such as, for example, water, low-molecular mass alcohols, low-molecular mass ethers, low-molecular mass ketones, low-molecular mass esters, low-molecular mass hydrocarbons, etc. This suspension may then be dropped onto a fast spinning substrate (typically about 1000-3000 rpm) and is thus spread out quickly into a thin-film over the substrate due to the high centrifugal forces exerted on the droplets. Because of the extremely low mass or volume per unit area, thin-films of a volatile solvent evaporate quickly leaving the solute or suspended or dispersed material precipitated on the substrate. The spin coating process may be repeated multiple times so as to increase the thickness of a given film. To further the evaporation process of the solvent and the precipitation of the solute, or suspended or dispersed material, the spinning substrate may be heated. Alternatively, the spin coating suspension may additionally contain binder material or binder precursor material as well as electrical conduction enhancer material. All of these materials do not and are not intended to evaporate during the spin-coating process, either conducted at ambient conditions or at elevated temperatures, as described above, and/or vacuum. Depending on the spin coating suspension formulations, an additional drying, adhesion, formation, and/or crystallization step at temperatures of up to about 1000° C., as described above, may be required to form the final cathode or composite cathode.

According to an exemplary embodiment of the present invention, a non-vapor phase $LiCoO_2$ cathode film may be developed using electrophoretic deposition as discussed by Kanamura et al. in 3 *Electrochem. Solid State Letters* 259-62 (2000) or by Lusk in GB Patent No. 1298746, both of which are incorporated herein by reference in their entirety. For example, micron size, fully crystallized $LiCoO_2$ particles may be suspended in a solution of acetone, isopropanol, and/or iodine and may enable the electrophoretic deposition of, for example, an about 9 μm thick, fully crystalline $LiCoO_2$ cathode film onto stainless steel substrate without any columnar structure. This process may be performed, for example, at less than about 120VDC within about 30 minutes at room temperature.

Figure 5:
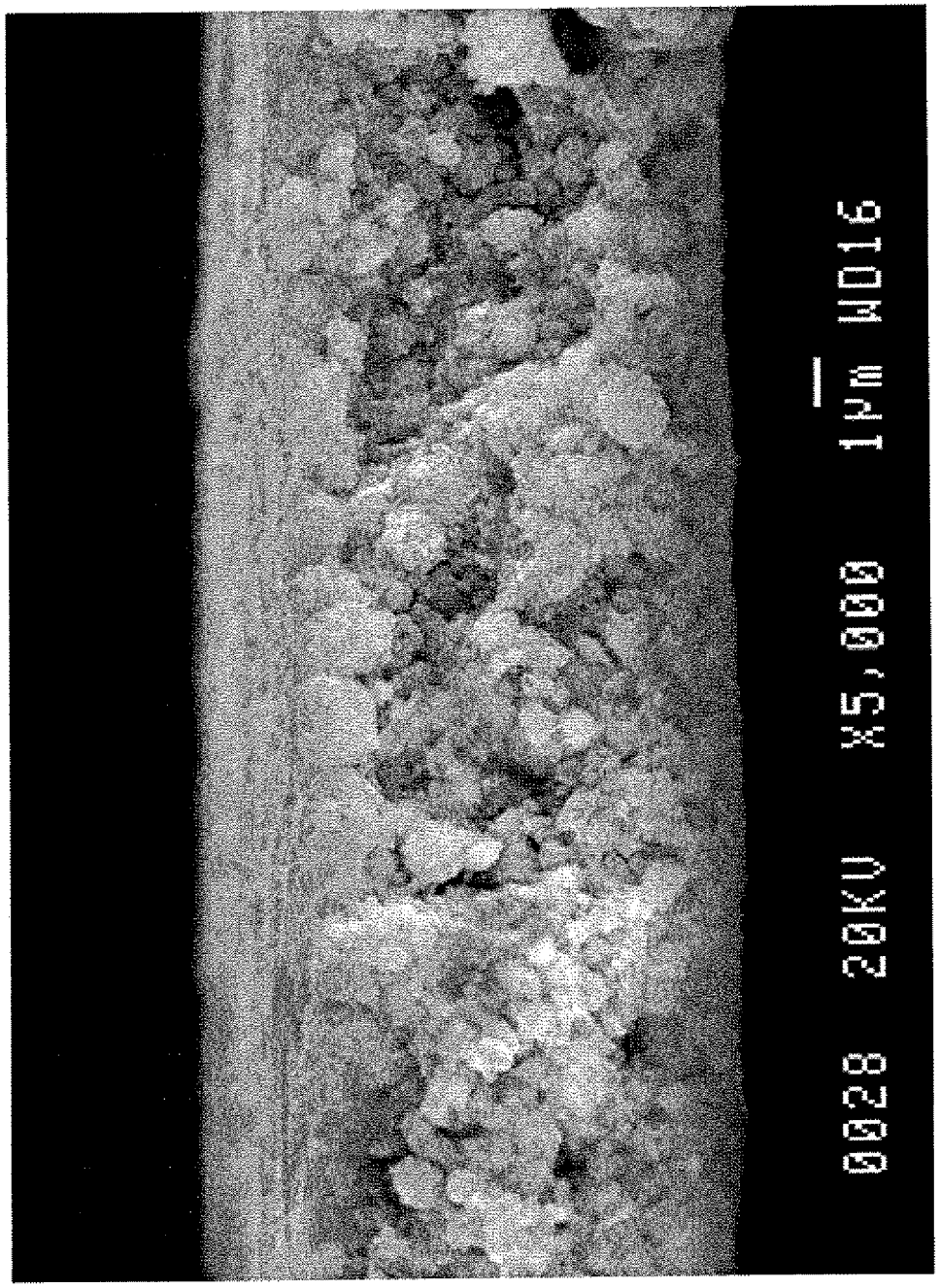
FIG. 5 depicts a scanning electron micrograph of a 9 μm thick, fully crystalline $LiCoO_2$ positive cathode film fabricated by electrophoretic deposition according to an exemplary embodiment of the invention.
Figure 6:
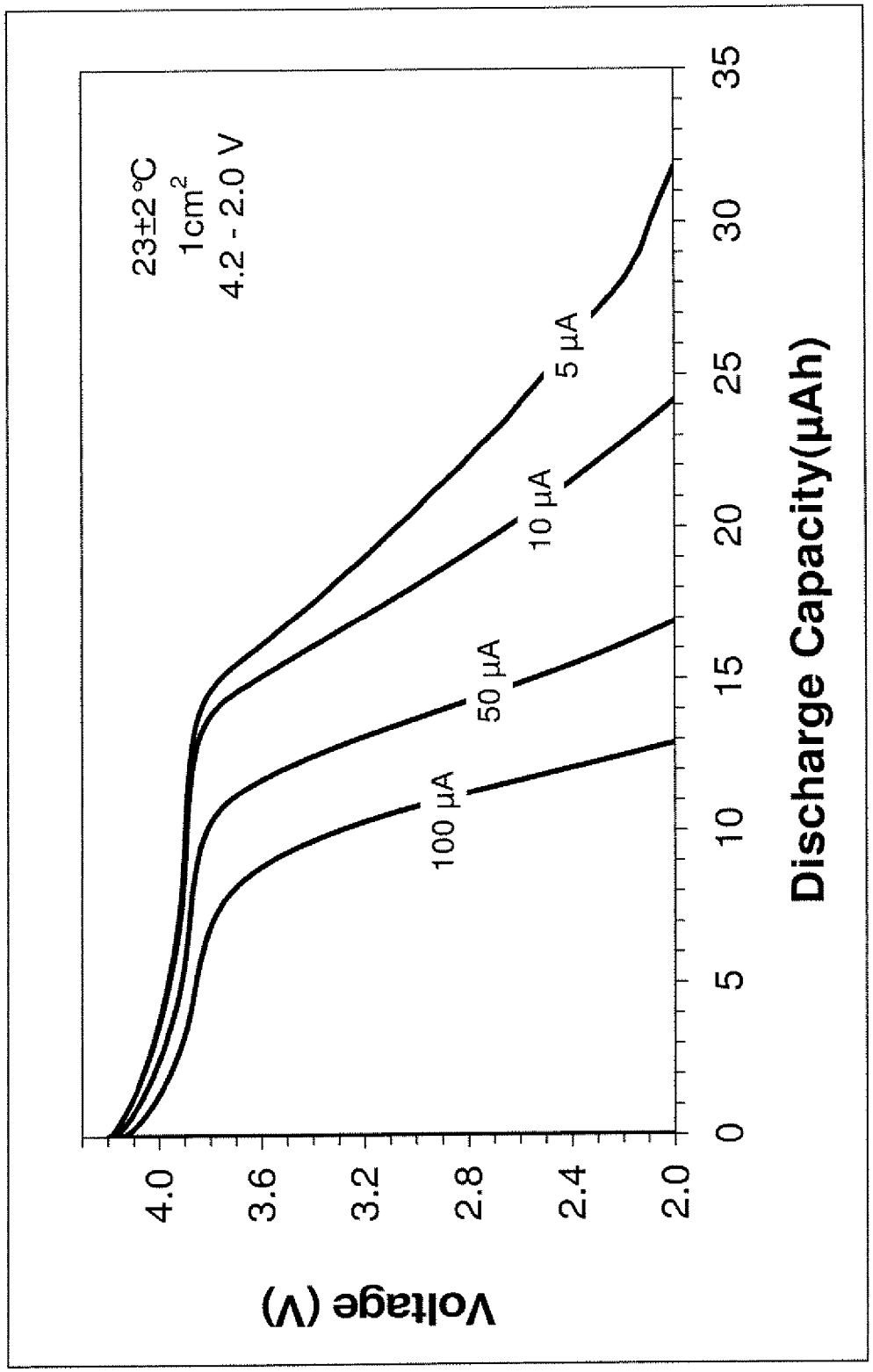
FIG. 6 shows the current-discharge voltage performance of a thin-film electrochemical device whose $LiCoO_2$ positive cathode was fabricated by electrophoretic deposition according to an exemplary embodiment of the invention.
Figure 7:
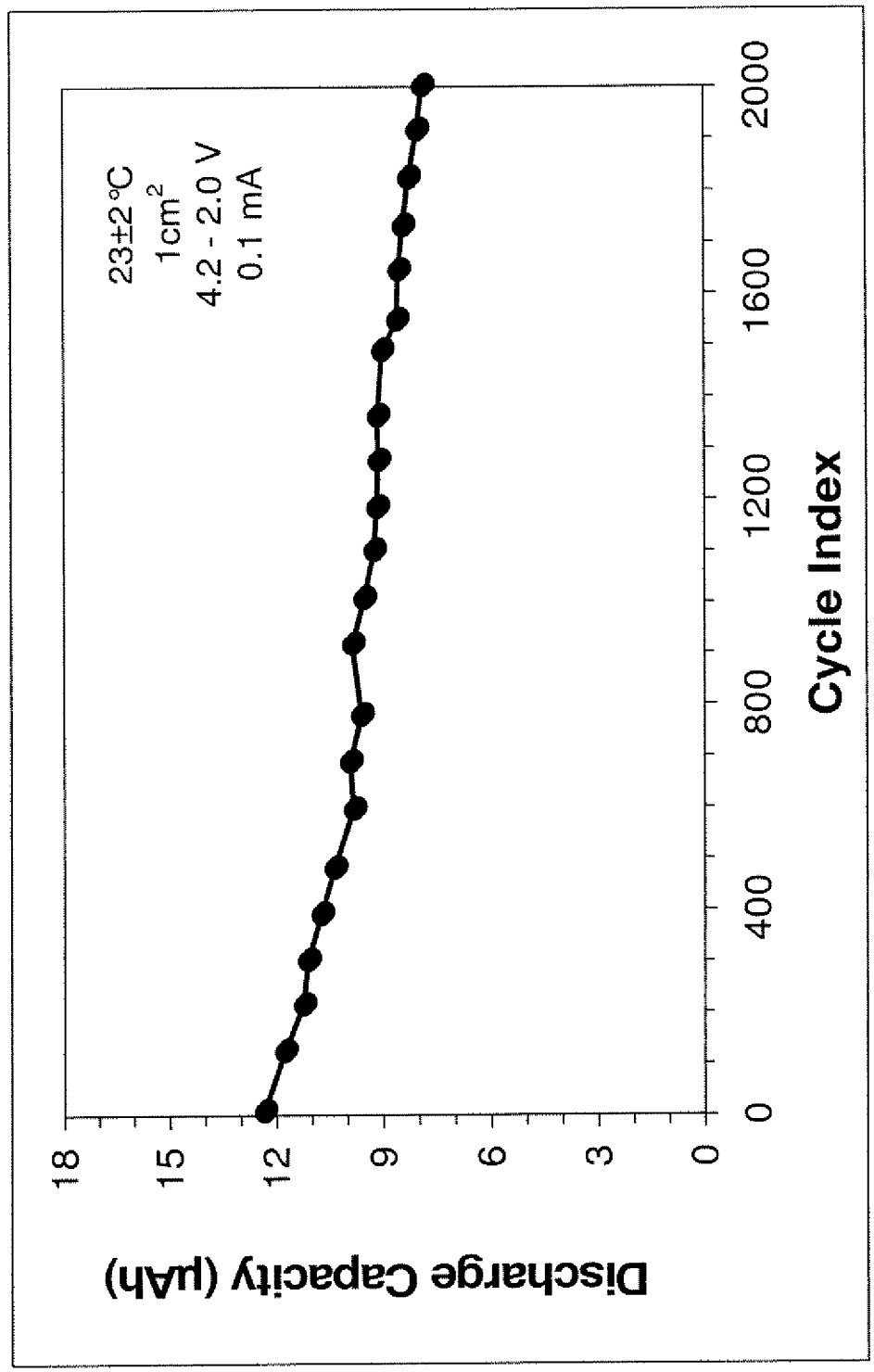
FIG. 7 shows the reversible discharge capacity as a function of cycle number of a thin-film electrochemical device whose $LiCoO_2$ positive cathode was fabricated by electrophoretic deposition according to an exemplary embodiment of the invention.

FIG. 5 depicts a scanning electron micrograph of an exemplary positive cathode film in cross-sectional view deposited with electrophoretic deposition. The potential iodine impurity concentration of the film shown in the figure is below the detection limits (<1 wt %) of the energy dispersive x-ray spectroscopic method employed. Electrochemical cells may also be fabricated with thinner $LiCoO_2$ composite cathodes by electrophoretic deposition, for example, in a solution consisting of about 200 ml acetone, about 23 mg $I_2$, about 38 mg carbon black, and about 53 mg poly(tetrafluoroethylene) (PTFE) into which about 1 g of fully crystalline $LiCoO_2$ particle powder was suspended. In such an embodiment, the driving voltage of 50VDC for this electrophoretic deposition may be applied, for example, for about 30 seconds. Following which, the so-deposited $LiCoO_2$ composite film may be annealed at approximately about 377° C. in air for about 4 hours to improve adhesion to the conductive substrate. Subsequently, the fabrication of the electrochemical device may be completed by depositing an about 2 μm thick LiPON electrolyte using RF magnetron sputter over the $LiCoO_2$ composite cathode, then fabricating approximately about 0.3 μm thick Cu anode current collector film by electron beam evaporation, which may then be followed by a thermal (resistive) vacuum deposition of an about 3 μm thick metallic Li anode. The current-discharge voltage performance of such an electrochemical device is presented in FIG. 6, while its electrochemical cycle stability is shown in FIG. 7. Depending on the formulation of the electrophoretic suspension, an additional drying, adhesion, formation, and/or crystallization step at temperatures of up to about 1000° C., as described above, may be required to form the final cathode or composite cathode.

According to an exemplary embodiment, a thick cathode may be deposited using a sol-gel method. In this embodiment, for example, an oxidic cathode film material to be deposited is provided in a precursor state, such as aqueous or alcoholic sols or gels of lithium and cobalt ions that are electrically balanced by anionic counter ions or chelates. These anionic counter ions or chelates may comprise, for example, nitrate, glycolate, hydroxide, citrate, carboxylates, oxalate, alcoholate, or acetylacetonate. Such formulations may be dip coated or sprayed onto the substrate and then dried at elevated temperatures for extended periods of time, for example, less than 2 days. In addition, the so-fabricated films may be subjected to a high-temperature pyrolysis process so as to convert the anionic counter ions or chelates quantitatively into pure oxides. This method is discussed in the Ph.D Thesis of Bernd J. Neudecker, Stuttgart, Germany (1994); by Plichta et al., in 139 *J. Electrochem. Soc.* 1509-13 (1992); and by Nazri, U.S. Pat. No. 5,604,057. Alternatively, the sol-gel may additionally contain binder material or binder precursor material, as well as electrical conduction enhancer material. All of these additives do not, and are also not intended to evaporate during the drying process, either done at ambient conditions or at elevated temperatures, as described above, and/or vacuum. Depending on these sol-gel formulations, an additional drying, adhesion, formation, and/or crystallization step at temperatures of up to about 1000° C., as described above, may be required to form the final cathode or composite cathode.

Figure 8:
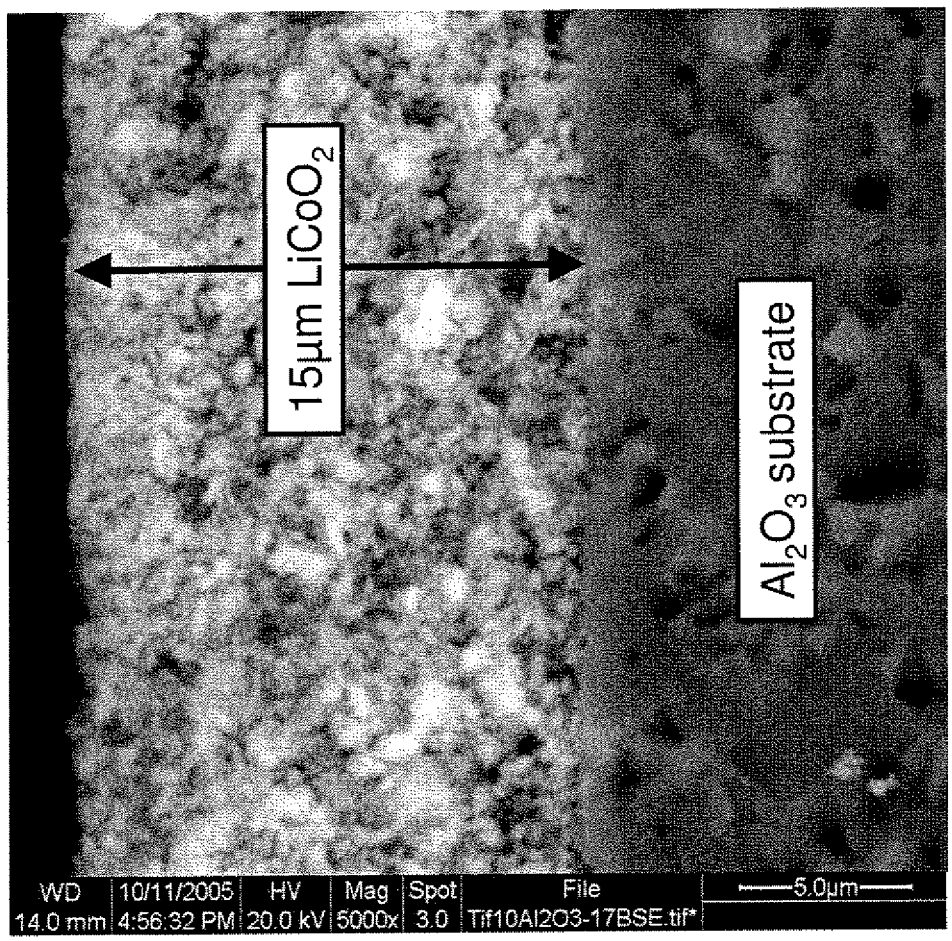
FIG. 8 shows a scanning electron micrograph of an about 15 μm thick, fully crystalline $LiCoO_2$ positive cathode film deposited by ink-jetting according to an exemplary embodiment of the invention.

In an exemplary embodiment of the present invention, the thick cathode may be deposited using an ink-jet method. Ink-jetting of oxide film electrodes is discussed by Watanabe Kyoichi et al. in JP 2005011656, Speakman in U.S. Pat. No. 6,713,389 and Hopkins et al. in U.S. Pat. No. 6,780,208, which are incorporated herein in their entirety by reference. In one embodiment of the present invention, fully crystallized $LiCoO_2$ powder may be milled to about 0.55 μm in average particle size, and then dispersed in an aqueous solution of about 0.05 vol % iso-octanol, about 5 vol % isopropanol, about 10 vol % ethylene glycol monobutyl ether, and about 10 vol % ethylene glycol. This solution may then be sonicated for about 1 hour to form a suitable ink-jet solution. The $LiCoO_2$ films may then be deposited through a print head and wetted ceramic, for example, about 250 μm thick $Al_2O_3$ plates, and a stainless steel substrates well, for example, an about 50 μm foil. Subsequent to the printing, the as-deposited $LiCoO_2$ films may be dried in air at about 200° C. for about 2 hours in order to drive off excess solvent and improve the adhesion of the $LiCoO_2$ film to its substrate. A dried $LiCoO_2$ film thickness of about 15 μm may be achieved based on ten print head passes over the same substrate region. A cross-sectional scanning electron micrograph view of such a $LiCoO_2$ film is shown in FIG. 8. Alternatively, the ink-jet solution or suspension may contain binder material, binder precursor material, and/or electrical conduction enhancer material. If used, each of these materials do not, and are also not intended to evaporate during the drying process, whether at ambient conditions or at elevated temperatures, as described above, and/or in a vacuum. Depending on these formulations of the ink-jet solution or suspension, an additional drying, adhesion, formation, and/or crystallization step at temperatures of up to about 1000° C., as described above, may be required to form the final cathode or composite cathode.

According to an exemplary embodiment, a cathode fabricated by a non-vapor phase deposition may be coated, in its finished or unfinished state, for example, with an inert, metallically conducting layer, such as gold. Subsequently, a finished or unfinished cathode and an inert, metallically conducting coating may be, for example, heated together for further drying, adhesion, formation, and/or crystallization during which processes the inert, metallically conducting coating may be substantially absorbed into the pores, voids, and crevices of the cathode, thus improving the electrical conduction of the cathode.

The anode in the exemplary embodiments described above may be deposited using a variety of methods. For example, the anode material may be deposited using a vacuum vapor phase growth method, or a non-vapor phase growth method, such as ink-jetting or dip coating.

An exemplary embodiment of the present invention includes depositing a negative anode material via a vacuum vapor phase growth method. Typical vapor phase growth methods for negative anodes include, but are not limited to, reactive or non-reactive RF magnetron sputtering, reactive or non-reactive DC diode sputtering, reactive or non-reactive thermal (resistive) evaporation, reactive or non-reactive electron beam evaporation, ion-beam assisted deposition, or plasma enhanced chemical vapor deposition. The negative anode may either be, for example, metallic lithium, a lithium alloy, or a metal that can form a solid solution or a chemical compounds with lithium.

Other exemplary embodiments may include non-vapor phase growth methods for depositing a negative anode. For example, non-vapor phase growth methods, such as ink-jetting of metallic lithium powder mixtures may be used to deposit a negative anode. Such methods are described by Nelson et al. in U.S. Patent Publication No. 2005/0239917. As well, for example, one could simply dip a sample into molten lithium under a protective atmosphere and allow the resulting film on the sample to cool and solidify. Analogously, one may fabricate a lithium-ion anode, such as metallic tin, by dipping a sample into molten tin under air atmosphere or transfer the molten or hot tin on a flattened face of a, for example, rod and then stamp the tin onto the sample.

A dip coating technique via sol-gel route may similarly work for depositing negative anode materials as described, for example, by Patrusheva et al. in RU Patent No. 2241281C2, which is incorporated herein by reference in its entirety. For example, $SnO_2$ based Li-ion anodes using suitable anionic formulations of alkoxides may be used, as described by Toki Motoyuki in U.S. Pat. No. 6,235,260, which is also incorporated herein by reference in it entirety.

Figure 9:
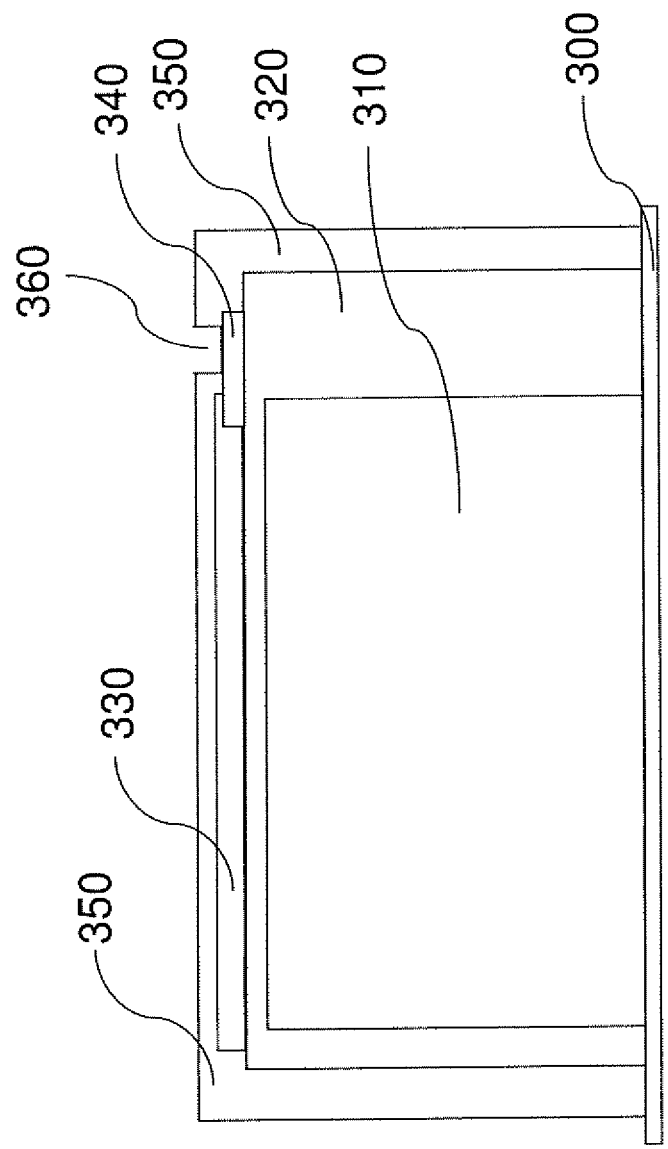
FIG. 9 shows a hybrid thin-film electrochemical device without a substrate according to an exemplary embodiment of the present invention.

FIG. 9 shows an exemplary hybrid thin-film electrochemical device fabricated without a substrate according to an embodiment of the present invention. This device is similar to that shown in FIG. 2, but does not have a substrate. Instead, the device is spatially terminated by a thin metal layer 300 that may be used, for example, as a current collector and electrical terminal. In addition to this thin metal layer 300, the device in FIG. 9 comprises at least a cathode 310, an electrolyte 320, and an anode 330.

The embodiments described above may be encapsulated using an encapsulation 350 selected from the group consisting of vacuum vapor phase grown thin-film encapsulation, pressure-heat lamination of protective polymer composites as described by Snyder et al. in U.S. Pat. No. 6,916,679, pressure-heat lamination of metal foils coated with pressure-heat sensitive adhesive surfaces, and metal canning.

An anode current collector 340, such as Zr may be interposed between the electrolyte 320, the anode 330, and the encapsulation 350. Furthermore, a moisture barrier may be applied between the anode current collector 340 and the underlying moisture sensitive electrolyte 320 to protect latter from the environment. A material having moisture blocking properties may be selected: a) from the group of metals, semi-metals, alloys, borides, carbides, diamond, diamond-like carbon, silicides, nitrides, phosphides, oxides, fluorides, chlorides, bromides, iodides; b) from the group of any multinary compounds composed of borides, carbides, silicides, nitrides, phosphides, oxides, fluorides, chlorides, bromides, and iodides; or c) from the group of high-temperature stable organic polymers and high-temperature stable silicones. This moisture barrier, for example, may comprise $ZrO_2$ or ZrN and may be part of the anode current collector 340 that may be gradiented in terms of its oxide or nitride content thus reaching a stoichiometry of $ZrO_2$ or ZrN near the interface to the electrolyte.

Figure 10:
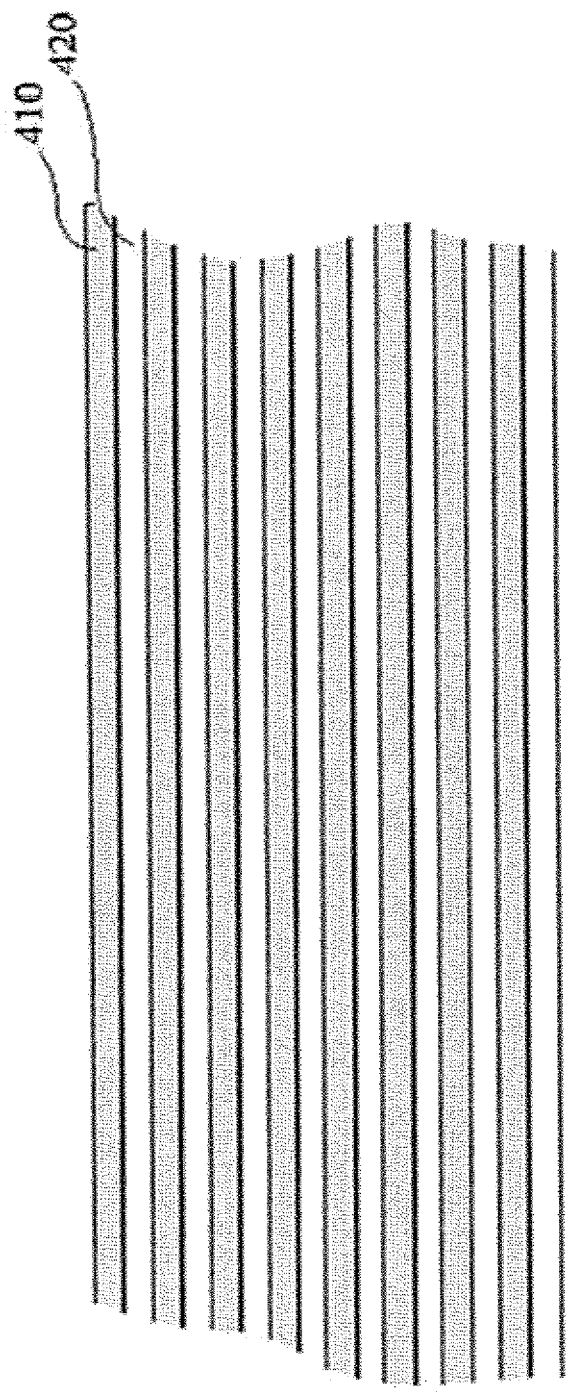
FIG. 10 shows a multi-layer thin-film used to encapsulate an electrochemical device according to an exemplary embodiment of the present invention.

FIG. 10 shows an embodiment of an electrochemical device with a multilayer thin-film encapsulation material. The multilayer thin-film encapsulation 400 may be comprised, for example, of multiple strong metallic getter layers 410 with alternating amorphous or glassy oxide or nitride layers 420 thereof. The strong metallic getter layers 410 are used to protect the device from moisture and oxygen based on their superior gettering ability for $H_2O$ and $O_2$. The strong metallic getter layers may, for example, be comprised of Zr, Y, Ti, Cr, Al, or any alloy thereof. The glassy or amorphous layers 420 may be the oxides or nitrides of the metal or metals used in the getter layers, such as, for example, $ZrO_2$, ZrN, $Y_2O_3$, YN, $TiO_2$, TiN, $Cr_2O_3$, CrN, $Al_2O_3$, AlN, or any multi-element compound thereof. The mechanically dense glassy or amorphous layers being substantially free of grain boundaries may, for example, effectively block any moisture or oxygen diffusion through said oxides or nitrides. As a result, the multilayer thin-film encapsulation may effectively protect the underlying, air sensitive metallic anode.

In another exemplary embodiment, for example, the multilayer thin-film encapsulation consists of inorganic high-temperature stable or resilient materials. Using such an encapsulation increases the high temperature stability of the electrochemical device as compared with an electrochemical device that employs polymeric components in its encapsulation, such as is the case in the above-mentioned pressure-heat laminated encapsulation described by Snyder et al. in U.S. Pat. No. 6,916,679.

Another exemplary embodiment of inorganic high-temperature stable or resilient materials may include a multilayer thin-film encapsulation having vacuum vapor phase deposited alternating layers. For example, a thin-film encapsulation may comprise or consist of 30 alternating 1000 Å thick layers of the sequence $ZrO_2$/Zr/$ZrO_2$/Zr/ . . . or ZrN/Zr/ZrN/Zr/ . . . , although it is to be understood that different sized thickness, periods and materials may be used. These alternating layers may be deposited at less than about 100° C. substrate temperature in one vacuum chamber pump-down from ambient pressures, for example. Such an exemplary 30 multilayer thin-film encapsulation may, for example, be only about 3 µm thick and high-temperature stable to far above about 300° C.

As those skilled in the art will appreciate, the mere thinness of such a thin-film encapsulation directly increases the energy, capacity, and power of a given electrochemical device per unit volume (volumetric energy, volumetric capacity, and volumetric power) compared with an electrochemical device that uses a pressure-heat laminated encapsulation, which is typically thicker by at least one order of magnitude than the presented thin-film encapsulation of about 3 µm. For example, the volumetric quantities of energy, capacity, and power can increase three-fold when for a given electrochemical device of, for example, 150 µm in total packaged thickness, which may comprise an actual electrochemical cell of, for example, 10 µm in thickness, a, for example, 35 µm thick substrate, and a, for example, 100 µm thick pressure-heat laminate, the encapsulation is replaced by a thin-film encapsulation of, for example, 3 µm in thickness, which results in an overall thickness of the electrochemical device of 48 µm.

Figure 11:
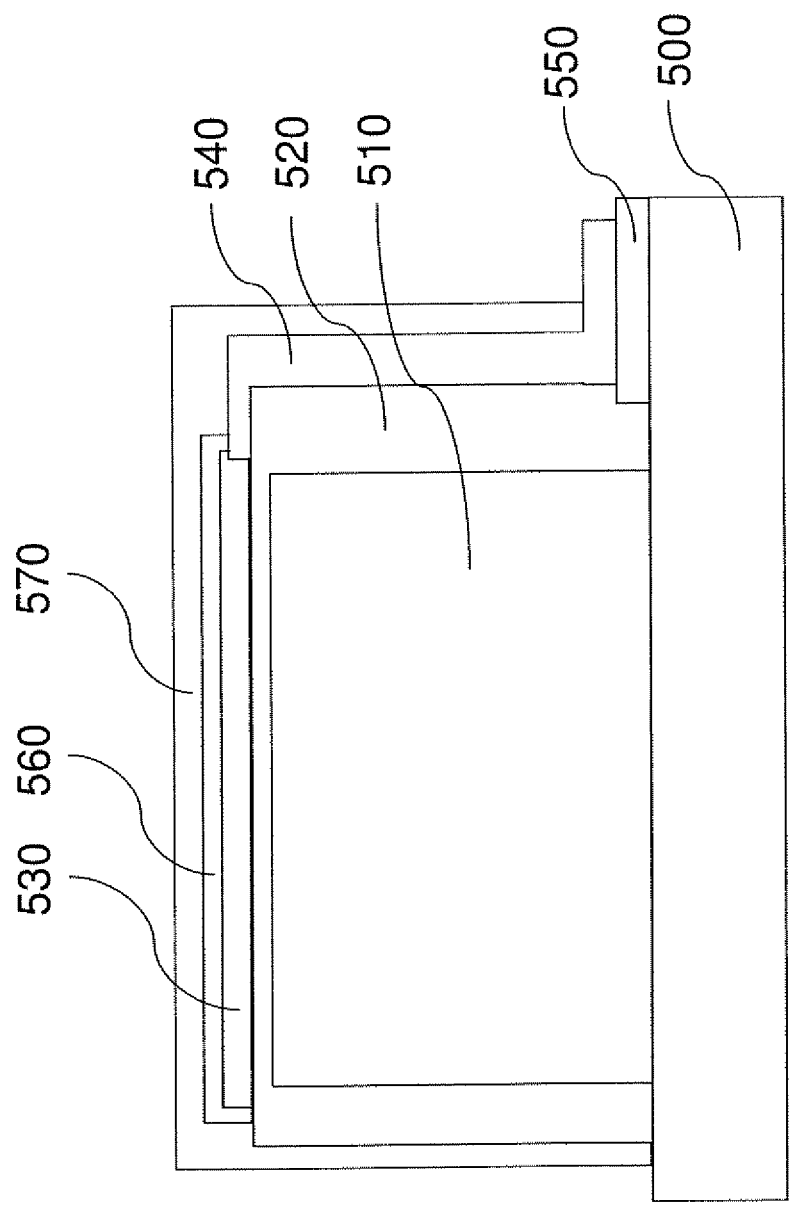
FIG. 11 shows the electrochemical device shown in FIG. 2, including a modulating LiPON layer and a multi-layer thin-film encapsulation layer according to an exemplary embodiment of the present invention.

FIG. 11 shows an electrochemical device according to an exemplary embodiment of the present invention. In addition to the electrically conductive substrate 500, the positive cathode 510, the electrolyte film 520, the negative anode 530, the anode current collector 540, and the electrical insulation layer 550, this embodiment includes an encapsulation layer 570. This encapsulation may be, for example, a multilayer encapsulation as described above and as shown in FIG. 10. Between the encapsulation layer 570 and the anode 530, for example, a second LiPON layer 560 may be interposed. The encapsulation layer 570 may be fabricated onto the anode 530, which may comprise metallic lithium. The softness of the anode 530 material may cause the encapsulation layer 570 to crack due to the mechanically weak fundament provided by the soft anode 530 and/or the stress imbalance at the interface of the anode 530 encapsulation 570. Once cracked, the encapsulation 570 may cause exposure of the sensitive anode 530 to the ambient, which may destroy the anode. Using a glassy LiPON (or derivative) modulator layer 560, for example, may mechanically stabilize the soft anode surface while chemically encapsulating it.

FIG. 11, the cathode 510 may be thick when compared to the relative sizes of the electrolyte 520, substrate 500 (and cathode current collector in some embodiments), anode 530, anode current collector 540, electrical insulation layer 550, modulating LiPON layer 560, and thin-film encapsulation 570.

The underlying LiPON electrolyte layer 520 together with the overlying LiPON modulator layer 560 confine the interposed anode 530 while protecting it, not only mechanically, but also chemically. In this configuration, a metallic anode 530, such as, for example, metallic Lithium, may be melted when heated above its melting point at about 181° C. Due to its spatial confinement, chemical protection, and inertness towards LiPON well above the melting point of lithium, the metallic lithium anode 530 remains fixed at location and intact as a negative anode material inside of the described electrochemical device. This engineering design also enables the described electrochemical device being used in solder reflow processing or flip chip processing.

Many materials may be used as the anode, for example, copper lithium alloy or solid solutions, such as, $Li_xCu$, $Li_xZr$, $Li_xV$, $Li_xW$, $Li_xBe$, $Li_xBe_yCu$ etc. Those skilled in the art will recognize these and other materials that may be used for the anode. These alloys or solid solutions of lithium may offer stronger mechanical properties compared with soft metallic lithium, and thus may allow the direct deposition of the multilayer thin-film encapsulation 570 without the use of the above-described LiPON modulator layer 560 interposed between the soft negative metallic anode 530 and the multilayer thin-film encapsulation 570. In such case, the LiPON modulator layer 560 may be redundant.

In an example of the embodiment shown in FIG. 11, an electrochemical device may be fabricated, for example, onto a 25.4 mm×25.4 mm large aluminum substrate of 25 µm in thickness (500), coated with a 80 µm×3.3 cm² large $LiCoO_2$ composite positive cathode consisting of 62 volume % of $LiCoO_2$ powder and the volume balance of polymeric binder and electronically conducting carbon black powder (510), a 1.5 µm thin film of solid state LiPON electrolyte (520), a 10 µm thick negative, metallic lithium anode (530), a 0.5 µm thick nickel anode current collector (540), a 0.5 µm thick $ZrO_2$ electrical insulation layer (550), a 0.5 µm thick LiPON modulator layer (560), and a 3 µm thick multilayer thin-film encapsulation layer consisting of fifteen 1000 Å thick Zr/1000 Å thick $ZrO_2$ bi-stacks (570). In this example, the electrochemical device is 120 µm thick at its thickest cross-section and provides 10 mAh of continuous capacity within the voltage range of 4.2-3.0V with an average voltage of 4.0V, which results in a volumetric energy of 520 Wh/liter for the fully packaged electrochemical device. When using a 10 µm aluminum substrate instead of the 25 µm thick one, then the volumetric energy of this device increases from 520 Wh/liter to 590 Wh/liter.

In another exemplary embodiment, a barrier layer may be included. This barrier layer may be deposited onto a substrate, such as, for example, a metal foil substrate, wherein the barrier layer chemically separates the battery part (i.e., electrochemically active cell) from the substrate part of an electrochemical apparatus. The barrier may prevent diffusion of any contaminants entering the battery from the substrate as well as, for example, block ions from escaping the battery and diffusing into the substrate during both battery fabrication and during battery operating and storage conditions. Certain potentially suitable materials for a barrier layer may include poor ion conducting materials, for example, such as borides, carbides, diamond, diamond-like carbon, silicides, nitrides, phosphides, oxides, fluorides, chlorides, bromides, iodides, and any multinary compounds thereof. Of those compounds, electrically insulating materials may further prevent possible reactions between the substrate and the battery layers from occurring. For example, if a possible chemical reaction includes the diffusion of ions and electrons, an insulating barrier would provide a way to block the electrons, and thus prevent any such chemical reaction. However, a barrier layer may comprise electrically conducting materials as well, as long as they do not conduct any of the ions of the substrate or battery layer materials. For instance, ZrN is an effective conducting layer that will prevent ion conduction. In some cases metals, alloys, and/or semi-metals may serve as a sufficient barrier layer depending on the anneal temperatures applied during the battery fabrication process and substrate material used. The diffusion barrier layer may, for example, be single or multi-phase, crystalline, glassy, amorphous or any mixture thereof, although glassy and amorphous structures are preferred in some applications due to their lack of grain boundaries that would otherwise serve as locations for increased, but unwanted, ion and electron conduction.

A thin-film encapsulation layer, such as the one shown in FIGS. 10 & 11, may, for example, tent over the device. Therefore, a flexible encapsulation may, for example, be used to allow the device to expand and contract. The above-described glass-metal multilayer encapsulation possesses appropriate flexible properties, which can be tailored, for example, by changing the sputter deposition parameters, which then changes the densities of the glass and/or metal. Another approach to tuning the mechanical properties of the constituents of the thin-film encapsulation, and thus also the thin-film encapsulation itself may include changing the stoichiometry of one or more constituents of the thin-film encapsulant. For instance, ZrN can be changed to $Zr_2N$, which is equivalent to depriving the particular composition of this layer of nitride. Alternatively, one can change the metals in the stack. For example, instead of a Zr, ZrN, Zr, ZrN stack, one could fabricate a multilayer thin-film encapsulation consisting of Zr, AlN, Cr, TiN.

Some of the embodiments above discuss a thick positive cathode that is inexpensive and reliable. The thick cathode may also be configured with a thin electrolyte, a thin anode, and a thin encapsulation so as to maximize the volumetric densities of capacity, energy, and power of the resulting electrochemical device.

Figure 12:
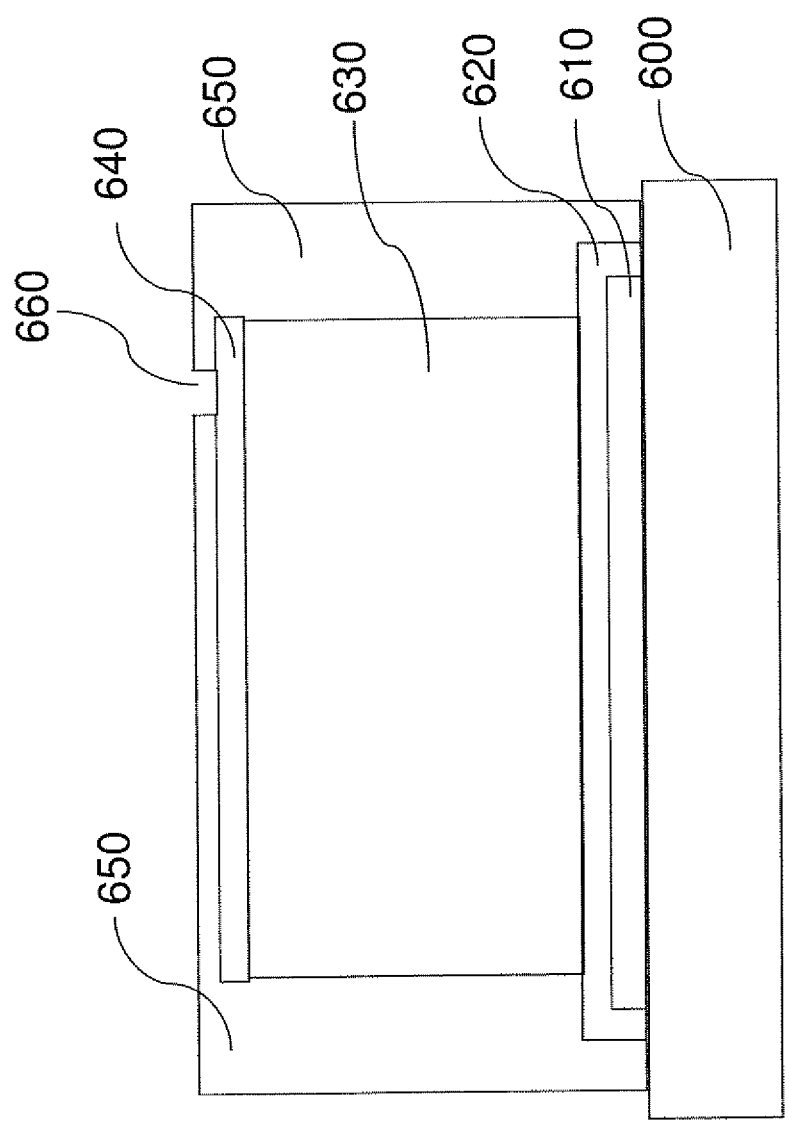
FIG. 12 shows an inverted thin-film battery configuration according to an exemplary embodiment of the present invention.

FIG. 12 shows another embodiment of the present invention, which depicts a configuration variant of the electrochemical device shown in FIG. 2 and termed inverted thin-film battery configuration. The negative anode 610 is chosen from the same materials and fabricated by the same methods as described for FIG. 2, when deposited directly onto substrate 600, which in turn is electrically conducting and chemically inert, such as, for example, Cu foil, to the anode 610. In this particular configuration, the substrate also serves as the anode current collector and negative terminal of a battery. If the substrate 600 is electrically insulating, then an additional anode current collector, consisting of, for example, Cu or Ni, may be interposed between said substrate 600 and the negative anode 610 (not shown). Electrical access to this anode current collector may be accomplished, for example, by either extending the anode current collector beyond the edge of the encapsulation 650 or providing an opening in the substrate 600. The opening in the substrate may then be filled with a conductive material, such as a Cu paste, in a manner that this material makes electrical contact with the anode current collector. Using the same materials and methods as for the electrolyte in FIG. 2, the electrolyte 620 is deposited over the anode 610. Using the same materials and methods as for the positive cathode in FIG. 2, the positive cathode 630 is deposited over the electrolyte 620. To allow electrical access to the positive cathode 630, a cathode current collector 640, such as Al or Au, is fabricated on top of the positive cathode 630. If encapsulation 650 is used on an electrochemical device, then one may provide an opening 660 in encapsulation 650 to allow electrical access to the positive cathode 630.

Figure 13:
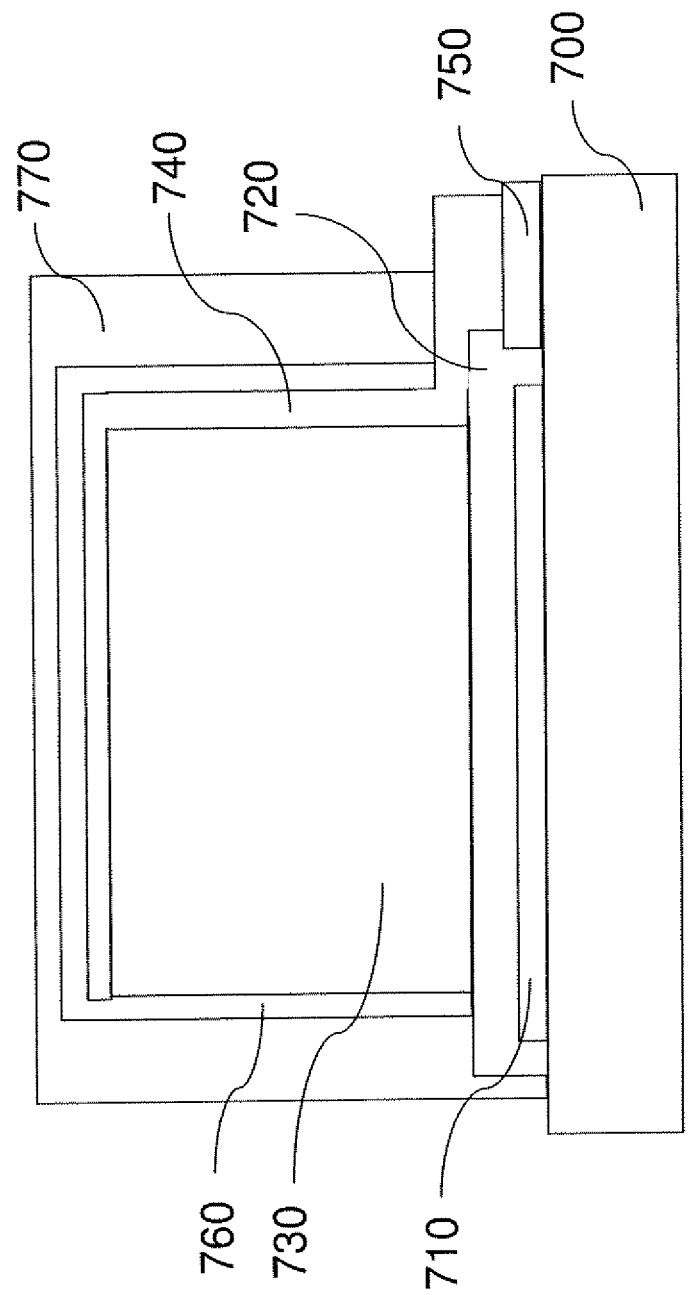
FIG. 13 shows an exemplary embodiment of an inverted thin-film battery.

Analogously, an electrochemical device may be fabricated with inverted thin-film battery configuration using the elements, materials and methods described in regard to FIG. 11. Such an electrochemical device, for example, is shown in FIG. 13. First, a negative anode 710 is directly deposited onto a chemically inert substrate 700. To avoid short-circuiting of an electrochemical device, an electrically insulating layer 750 may be fabricated which may be partially coated with an electrolyte 720 and may entirely tent over the anode 710. After depositing the electrolyte 720, the positive cathode 730 may be deposited followed by a cathode current collector 740. To employ a thin-film encapsulation 770 over the existing layers in the fabrication sequence of the electrochemical device, a mechanical and chemical modulation layer 760, for example, may be applied mainly over that area in the battery part of the electrochemical device which is defined by the cathode. Those skilled in the art will appreciate that the invention covers additional inverted configurations, which may be achieved by way of combining constituent parts of the non-inverted batteries described above.

In another embodiment, a barrier layer may be fabricated between the substrate and the battery part of the electrochemical device as described in U.S. patent application Ser. No. 11/209,536, entitled Electrochemical Apparatus with Barrier Layer Protected Substrate, filed 23 Aug. 2005, and incorporated by reference herein in its entirety. Depending on the material and configuration of the barrier layer, one or more additional current collectors may be fabricated onto the barrier layer so as to improve the electrical contact to the positive cathode, the negative anode or both.

The embodiments described above are exemplary only. One skilled in the art may recognize variations from the embodiments specifically described here, which are intended to be within the scope of this disclosure. As such, the invention is limited only by the following claims. Thus, it is intended that the present invention cover the modifications of this invention provided they come within the scope of the appended claims and their equivalents. Further, specific explanations or theories regarding the formation or performance of electrochemical devices according to the present invention are presented for explanation only and are not to be considered limiting with respect to the scope of the present disclosure or the claims.

What is claimed is:

1. An electrochemical device comprising:
   a non-vapor phase deposited positive cathode greater than about 0.5 µm and less than about 200 µm thick;
   a layer on the positive cathode;
   a vapor phase deposited electrolyte less than about 10 µm thick over the layer on said positive cathode;
   a negative anode less than about 30 µm thick is positioned directly on the vapor phase deposited electrolyte; and
   wherein said electrochemical device is non-rechargeable.

2. An electrochemical device comprising: a positive cathode greater than about 4 µm and less than about 200 µm thick; an electrolyte less than about 10 µm thick; a negative anode less than about 30 µm thick; and wherein said cathode comprises $CF_X$ material.

3. The electrochemical device of claim 2 wherein x falls within the range of 0 to 4.

4. The electrochemical device of claim 1 comprising a non-rechargeable cathode consisting of $CF_X$ material.

5. The electrochemical device of claim 4, wherein x falls within the range of 0 to 4.

6. The electrochemical device of claim 1 further comprising: a positive cathode greater than about 4 µm and less than about 200 µm thick.

7. The electrochemical device of claim 3 comprising a non-rechargeable cathode consisting of $CF_X$ material.

8. An electrochemical device comprising:
   a non-vapor phase deposited cathode;
   an anode; and
   a vapor phase deposited electrolyte less than about 10 µm thick and positioned directly on the anode;
   a layer between the cathode and the electrolyte; and
   wherein said electrochemical device is non-rechargeable.

9. An electrochemical device comprising:
   a non-vapor phase deposited cathode;
   an anode; and
   a vapor phase deposited electrolyte less than about 10 µm thick and positioned directly on the anode;
   a layer between the cathode and the electrolyte; and
   wherein said cathode comprises $CF_X$ material, and wherein x falls within the range of 0 to 4.

10. The electrochemical device of claim 6 comprising a non-rechargeable cathode consisting of $CF_X$ material.

11. A method of manufacturing an electrochemical device comprising:
    depositing a positive cathode comprising CFX that is greater than about 0.5 µm and less than about 200 µm thick;

depositing an electrolyte that is less than about 10 μm thick; depositing a negative anode that is less than about 30 μm thick; and depositing said positive cathode by a non-vapor phase deposition process.

12. The method of claim 11 wherein x falls within the range of 0 to 4.

13. A method of manufacturing an electrochemical device comprising: depositing a cathode comprising $CF_X$ using a non-vapor phase deposition process; depositing an electrolyte that is less than about 10 μm thick; and depositing an anode.

14. The electrochemical device of claim 1, wherein the layer is absorbed into the cathode.

15. The electrochemical device of claim 8, wherein the layer is absorbed into the cathode.

16. The electrochemical device of claim 9, wherein the layer is absorbed into the cathode.

* * * * *

UNITED STATES PATENT AND TRADEMARK OFFICE
CERTIFICATE OF CORRECTION

| | |
|---|---|
| PATENT NO. | : 8,431,264 B2 |
| APPLICATION NO. | : 12/179701 |
| DATED | : April 30, 2013 |
| INVENTOR(S) | : Neudecker et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 807 days.

Signed and Sealed this
Thirtieth Day of December, 2014

Michelle K. Lee
*Deputy Director of the United States Patent and Trademark Office*